(12) United States Patent
Gupta

(10) Patent No.: US 12,509,007 B2
(45) Date of Patent: Dec. 30, 2025

(54) METHOD AND AN ARRANGEMENT FOR SIGNAL TRANSMISSION BETWEEN A PLURALITY OF ELECTRICAL UNITS

(71) Applicant: Scania CV AB, Södertälje (SE)

(72) Inventor: Sandeep Gupta, Södertälje (SE)

(73) Assignee: Scania CV AB, Södertälje (SE)

( * ) Notice: Subject to any disclaimer, the term of this patent is extended or adjusted under 35 U.S.C. 154(b) by 167 days.

(21) Appl. No.: 18/270,543

(22) PCT Filed: Feb. 2, 2022

(86) PCT No.: PCT/SE2022/050107
§ 371 (c)(1),
(2) Date: Jun. 30, 2023

(87) PCT Pub. No.: WO2022/169393
PCT Pub. Date: Aug. 11, 2022

(65) Prior Publication Data
US 2024/0067108 A1    Feb. 29, 2024

(30) Foreign Application Priority Data

Feb. 4, 2021    (SE) .................................. 2150132-5

(51) Int. Cl.
*B60R 16/023*    (2006.01)
*B60R 16/03*    (2006.01)

(52) U.S. Cl.
CPC .......... *B60R 16/0239* (2013.01); *B60R 16/03* (2013.01)

(58) Field of Classification Search
CPC ................................................. B60R 16/0239
(Continued)

(56) References Cited

U.S. PATENT DOCUMENTS 5,954,538 A    9/1999    Huang
6,121,551 A    9/2000    Dobrow
(Continued)

FOREIGN PATENT DOCUMENTS

CN    202294319 U    7/2012
CN    207670343 U    7/2018
(Continued)

OTHER PUBLICATIONS

Scania CV AB, European Patent Application No. 22750114.5, Extended European Search Report, Nov. 19, 2024.
(Continued)

*Primary Examiner* — Michael R. Fin
(74) *Attorney, Agent, or Firm* — Moore & Van Allen PLLC; W. Kevin Ransom

(57) ABSTRACT

A method for a process of signal transmission between a plurality of electrical units, wherein the method comprises: electrically interconnecting the plurality of electrical units by way of a plurality of electrical junction blocks, each electrical junction block of the plurality of electrical junction blocks comprising one or more terminals. An arrangement for signal transmission between a plurality of electrical units, wherein the arrangement comprises a plurality of electrical junction blocks for electrically interconnecting the plurality of electrical units, and wherein each electrical junction block of the plurality of electrical junction blocks comprises one or more terminals.

12 Claims, 12 Drawing Sheets

(58) Field of Classification Search
USPC .......................................................... 307/10.1
See application file for complete search history.

(56) References Cited

U.S. PATENT DOCUMENTS

| | | | |
|---|---|---|---|
| 6,247,973 | B1 | 6/2001 | Chawa et al. |
| 10,780,847 | B2 * | 9/2020 | Takamatsu .......... B60R 16/0207 |
| 2002/0017796 | A1 | 2/2002 | Maynard et al. |
| 2005/0181635 | A1 | 8/2005 | Molinaro et al. |
| 2012/0330597 | A1 | 12/2012 | Lammers |
| 2019/0168695 | A1 * | 6/2019 | Nakamura .......... B60R 16/0239 |
| 2019/0173240 | A1 | 6/2019 | Nakamura et al. |
| 2019/0275967 | A1 | 9/2019 | Nakamura et al. |
| 2021/0323417 | A1 * | 10/2021 | Kwon ..................... B60L 53/22 |

FOREIGN PATENT DOCUMENTS

| | | |
|---|---|---|
| CN | 209281197 U | 8/2019 |
| WO | 2016191662 A1 | 12/2016 |

OTHER PUBLICATIONS

Scania CV AB, International Patent Application No. PCT/SE2022/050107, International Search Report, Mar. 30, 2022.
Scania CV AB, International Patent Application No. PCT/SE2022/050107, Written Opinion, Mar. 30, 2022.
Scania CV AB, Swedish Patent Application No. 2150132-5, Office Action, Oct. 11, 2021.
Scania CV AB, Swedish Patent Application No. 2150132-5, Office Action, Mar. 13, 2023.
Scania CV AB, International Patent Application No. PCT/SE2022/050107, International Preliminary Report on Patentability, Aug. 3, 2023.
Scania CV AB, Chinese Patent Application No. 202280008256.X, First Office Action, Jul. 10, 2025.

* cited by examiner

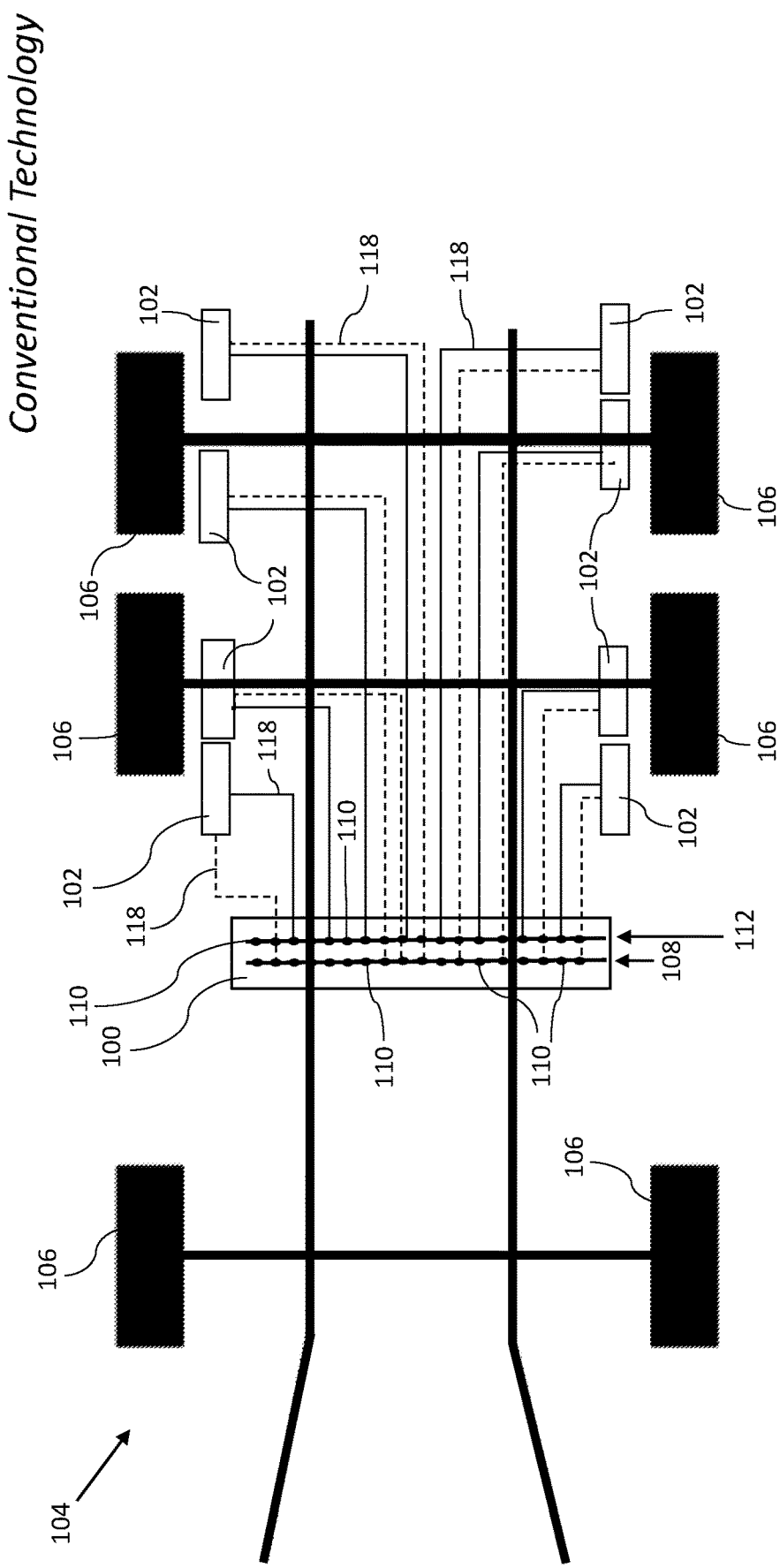

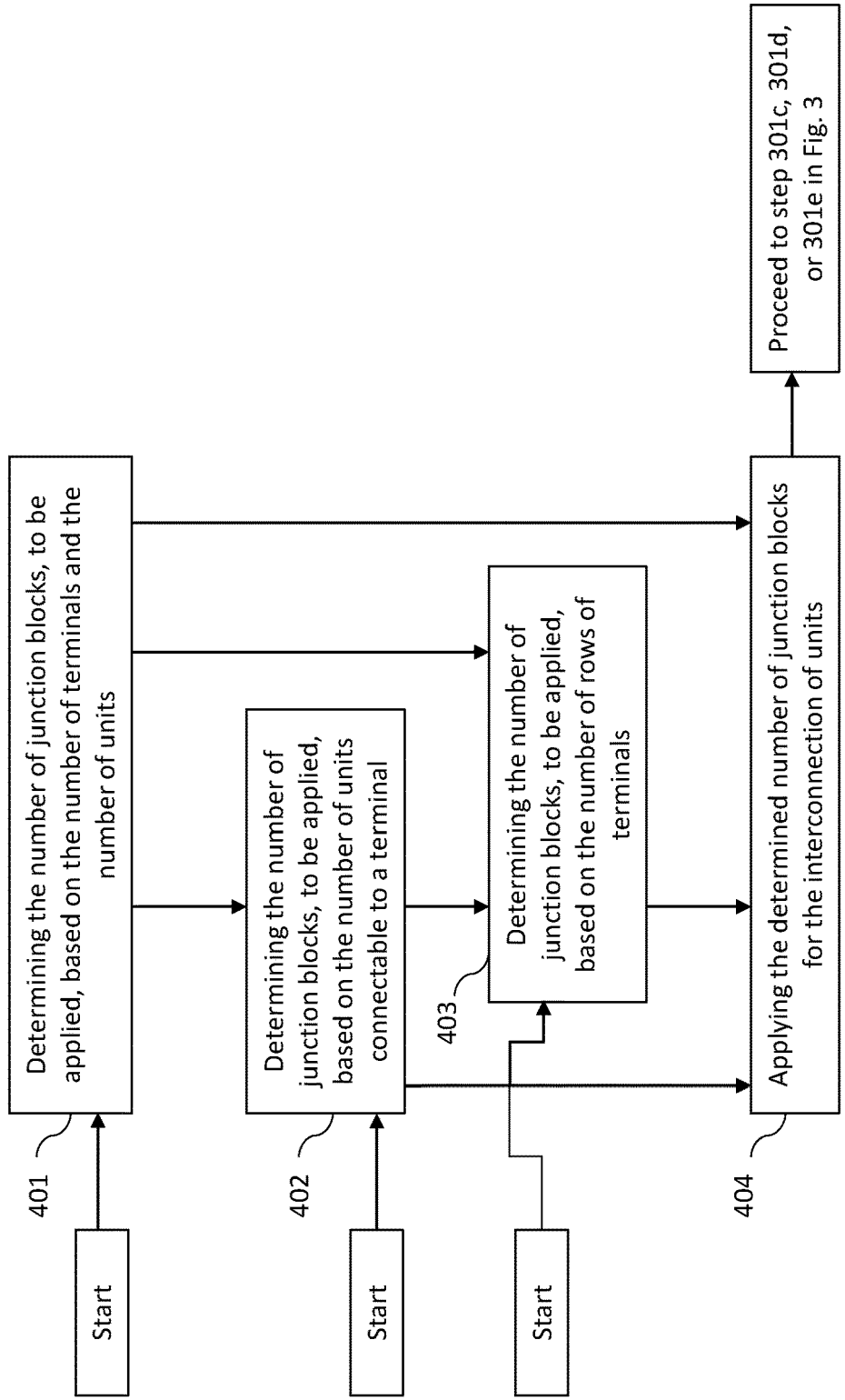

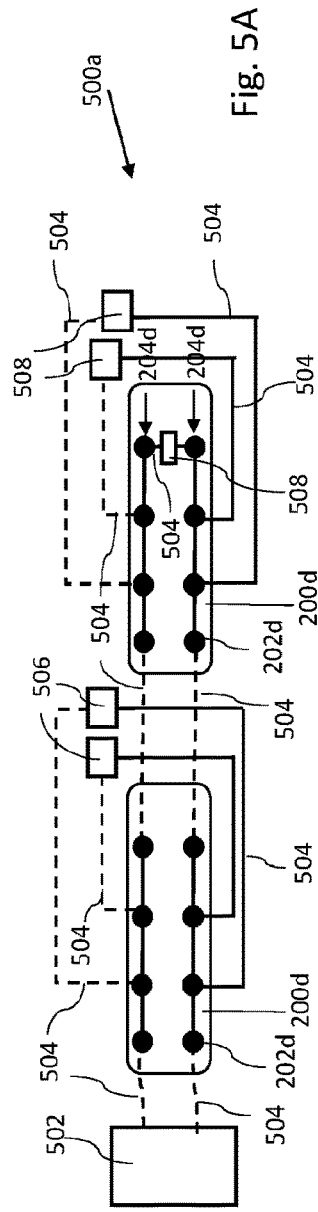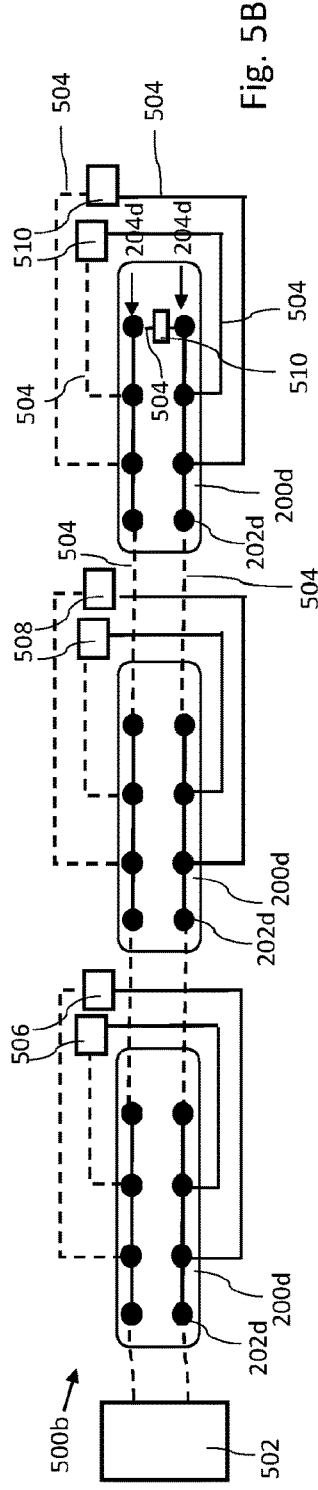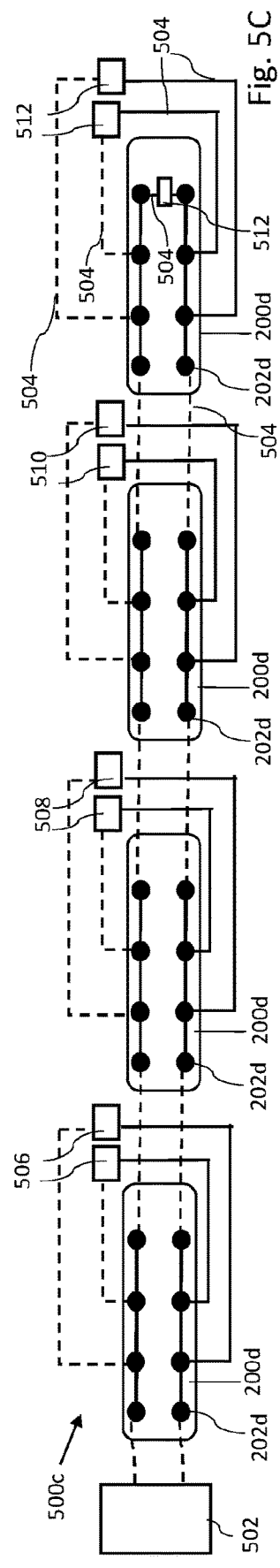

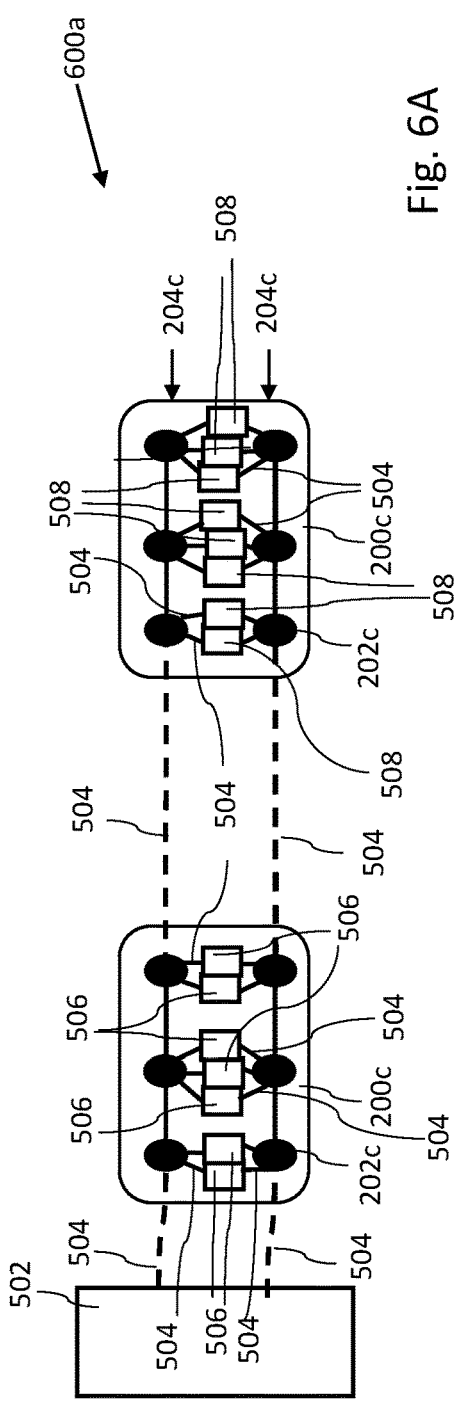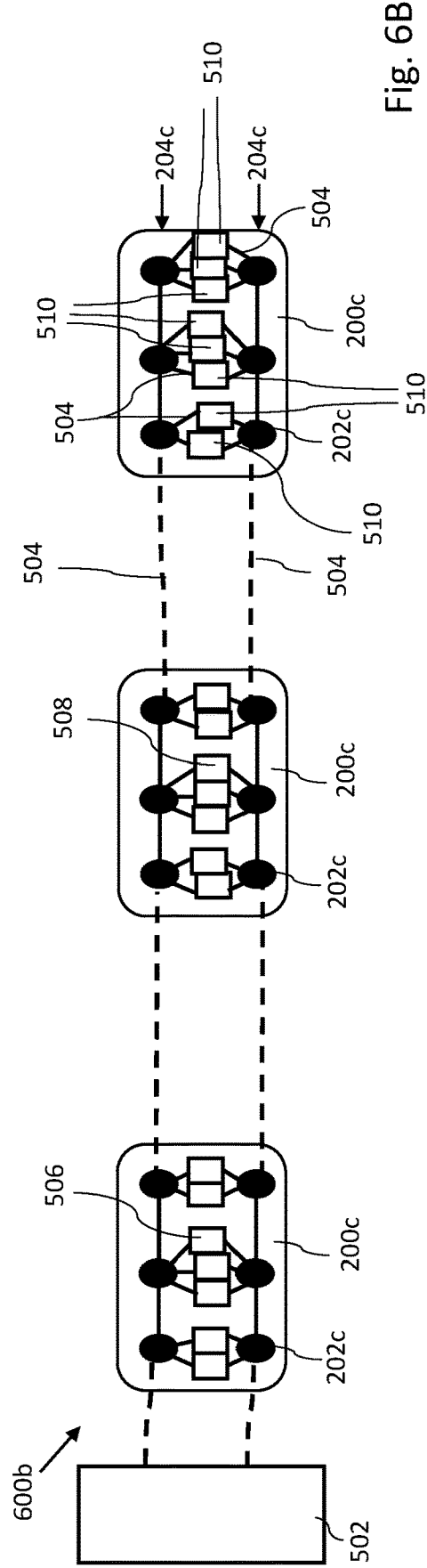

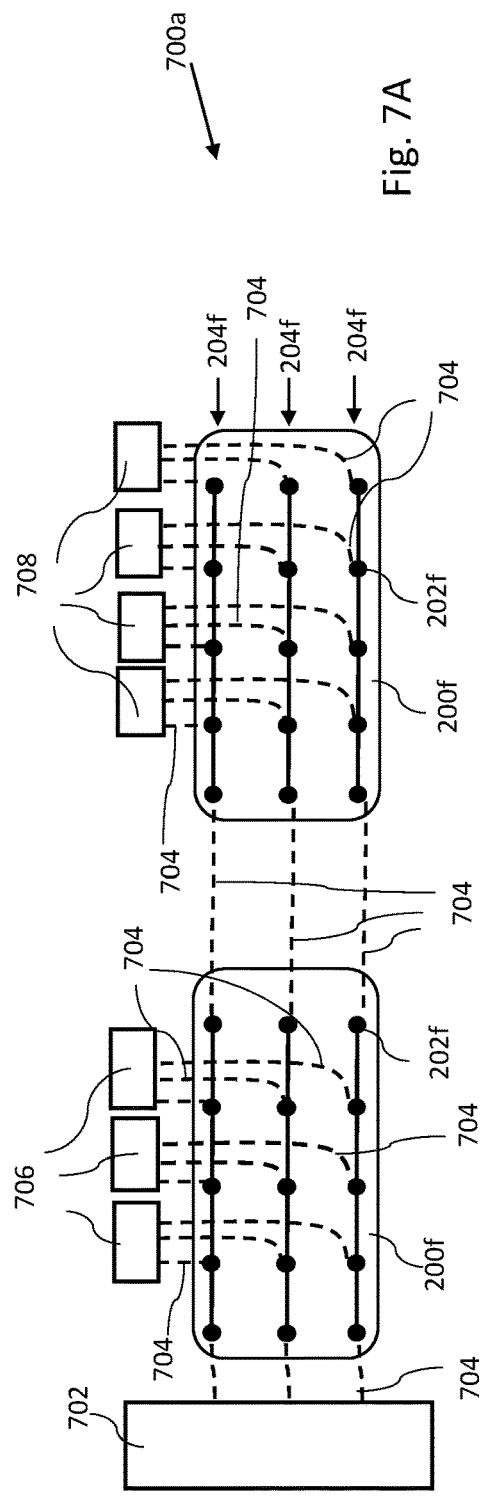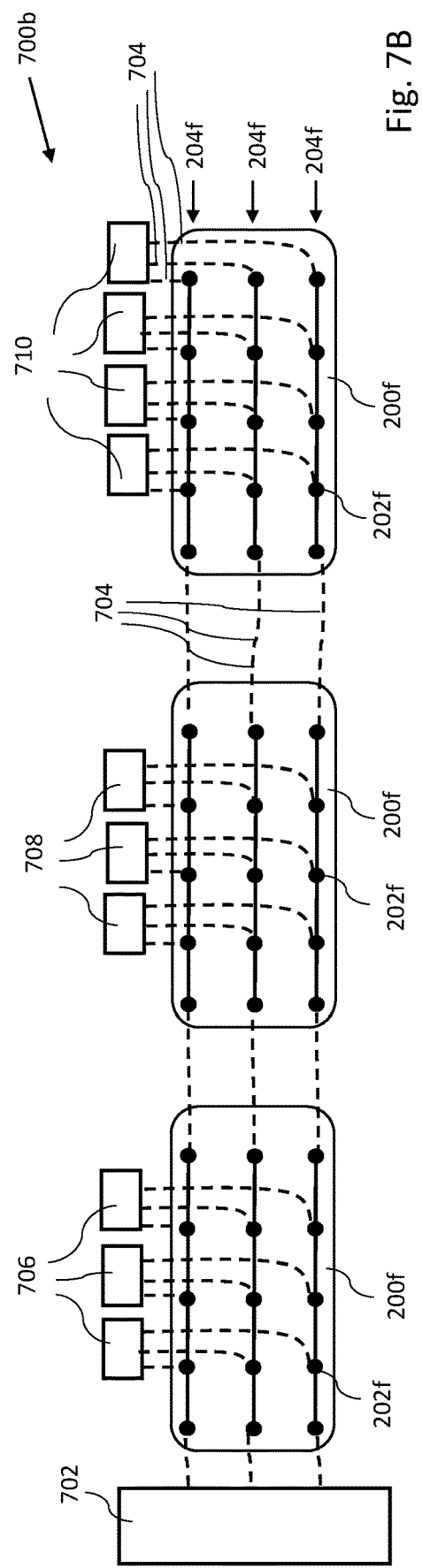

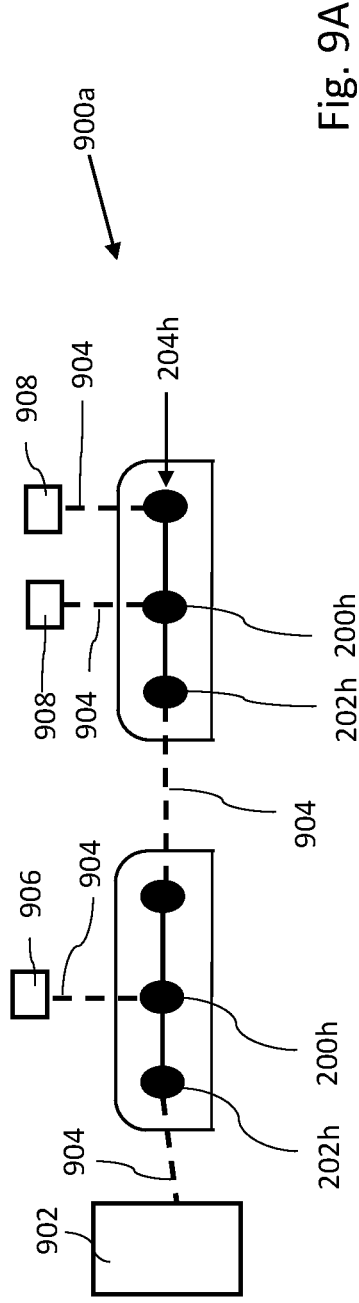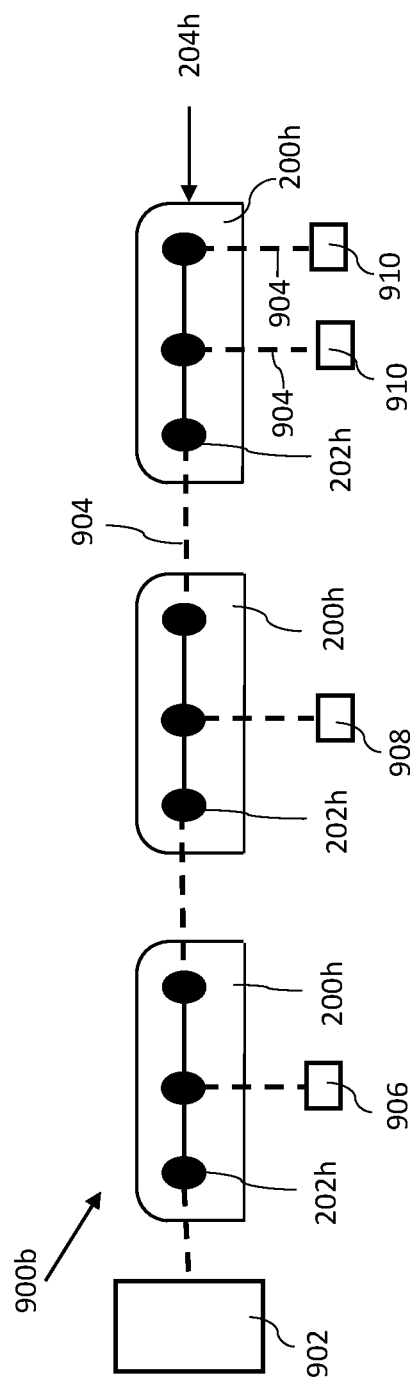

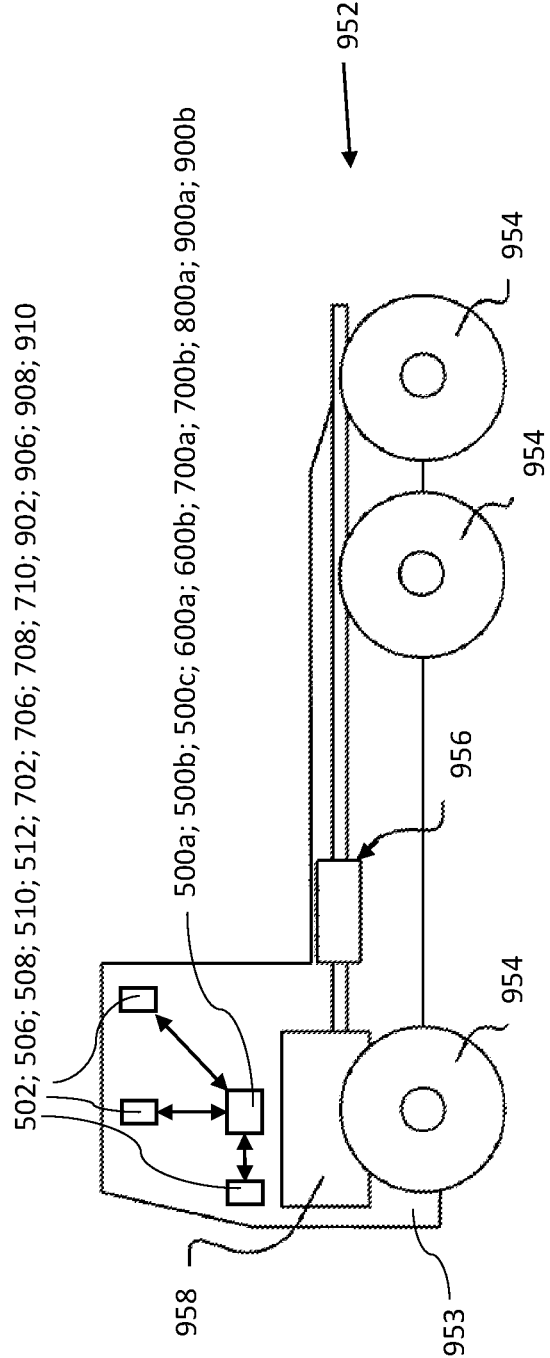

METHOD AND AN ARRANGEMENT FOR SIGNAL TRANSMISSION BETWEEN A PLURALITY OF ELECTRICAL UNITS

CROSS-REFERENCE TO RELATED APPLICATIONS

This application is a National Stage Patent Application (filed under 35 § U.S.C. 371) of PCT/SE2022/050107, filed Feb. 2, 2022, of the same title, which, in turn claims priority to Swedish Patent Application No. 2150132-5 filed Feb. 4, 2021, of the same title; the contents of each of which are hereby incorporated by reference.

TECHNICAL FIELD

Aspects of the present invention relate to a method for a process of signal transmission between a plurality of electrical units. Further, aspects of the present invention relate to an arrangement for signal transmission between a plurality of electrical units.

BACKGROUND

When electrical units are electrically connected, an electrical junction block is often used, for example when electrical units included in a vehicle are electrically connected. The electrical junction block has a plurality of terminals, for example in the form of pins. For example, in general, the use of the electrical junction block makes it possible to electrically connect a varying number of electrical units, for example electric lights or any other electrical devices, to one and the same electric power source. Further, in view of the large number of terminals of the electrical junction block, it is also possible and convenient to subsequently connect additional electrical units at a later stage, since the electrical junction block often has a surplus of terminals.

SUMMARY

The inventor of the present invention has found drawbacks in conventional solutions for electrically connecting electrical units by way of a conventional electrical junction block. For example, the inventor of the present invention has found that a conventional electrical junction block and cable or wire harnesses associated with the conventional electrical junction block are not efficient or optimal enough. For example, the inventor of the present invention has found that, in general, a large amount of cable, or wire, harnesses associated with a conventional electrical junction block is somewhat bulky and may occupy a relatively big space. The fact that cable harnesses may occupy a big space is problematic if the available space for cable harnesses and electrical connections is limited, for example with regard to vehicles.

An object of the invention is to provide a solution which mitigates or solves the drawbacks and problems of conventional solutions.

The above and further objects are solved by the subject matter of the independent claims. Further advantageous embodiments of the invention can be found in the dependent claims.

According to a first aspect of the invention, the above mentioned and other objects are achieved with a method for a process of signal transmission between a plurality of electrical units, wherein the method comprises:

electrically interconnecting the plurality of electrical units by way of a plurality of electrical junction blocks, each electrical junction block of the plurality of electrical junction blocks comprising one or more terminals.

An advantage of the method according to the first aspect is that the efficiency, or the optimality, of the electrical connection of the electrical units and/or the efficiency of the cable harness/-es is/are improved, since a reduced amount of cable harnesses, or wiring, is required, or a reduced volume of cable harnesses is required, for electrically connecting a plurality of electrical units. One reason for this is that the cable harnesses for all electrical units do not need to be pulled or routed all the way to one and the same main electrical junction block. Instead, several electrical units may be connected to subordinate electrical junction blocks located at a closer range to the electrical units in question. The subordinate electrical junction blocks in turn are directly, or indirectly via one or more other subordinate electrical junction blocks, connected to the main electrical junction block. Consequently, the required lengths of cables, or wires, of the cable harnesses are reduced and a less amount, or volume, of cable harnesses is thus required. An advantage of the method according to the first aspect is that the bulkiness of the required cable harness/-es is reduced. An advantage of the method according to the first aspect is that less space is occupied by cable harness/-es. As a result, installation space, which otherwise would be occupied by cable harnesses, is saved. Further, since a reduced amount or volume of cable harnesses is required, the weight of the cable harnesses is reduced, which is of importance for vehicles, since the consumption of fuel or electrical energy for the propulsion of the vehicle can be reduced with the reduced weight of the cable harnesses and of vehicle. Further, since the amount or volume of cable harnesses is reduced, the overall cost for the electrical installation is reduced.

An advantage of the method according to the first aspect is that a more flexible connection of electrical units is attained. An advantage of the method according to the first aspect is that the flexibility of the cable harness/-es is improved. In an optimal manner, the cable harnesses can be efficiently adapted to the number of electrical units to be installed or connected presently and in the future. All cable harnesses do not need to be pulled or routed all the way to the same conventional electrical junction block.

Further, the flexibility of the cable harness/-es and the flexibility of the connection of electrical units are also improved because of the modular concept of using a plurality of electrical junction blocks, since additional electrical junction blocks can be added and connected when required or desired, for example when additional electrical units are to be subsequently installed or connected at a later stage. Thus, the number of electrical junction blocks can be adapted to the number of electrical units to be connected in a modular manner. Thus, as a consequence, the overall cost for the electrical installation may be reduced.

An advantage of the method according to the first aspect is that the bulkiness of the cable harness/-es is also reduced because a plurality of electrical junction blocks is used instead of a single large conventional electrical junction block. A plurality of smaller electrical junction blocks, for example including a smaller number of terminals, can occupy an overall smaller space compared to a single large conventional electrical junction block, because the plurality of smaller electrical junction blocks can be more efficiently positioned and installed compared to one single large conventional electrical junction block. Thus, less space is occupied by the cable harnesses associated with the plurality of electrical junction blocks. Further, the electrical junction blocks can be positioned such that the lengths of the cables and the lengths of the routes of the cables are minimized in view of the locations of the electrical units, whereby the amount or volume of cables or cable harnesses is further reduced.

A large conventional electrical junction block is bulky and occupies a big space because of its large size in order to include a large number of terminals required for the connection of a large number of electrical units and also to include vacant terminals for the subsequent connections of future additional electrical units at a later stage. The fact that the conventional electrical junction block occupies a big space is problematic if the available space for electrical connections and cable harnesses is limited, for example with regard to vehicles. A single big conventional electrical junction block also increases the costs for the installation of electrical units, since the same sort of big conventional electrical junction block having the same number of terminals is always present irrespective of the number of electrical units to be connected. Thus, with a single big conventional electrical junction block, there will be cases when the conventional electrical junction block occupies a large space and adds to the costs, although all terminals will never be used. Thus, a large number of terminals of the conventional electrical junction block may always be vacant and never used.

Further, when all terminals of a single big conventional electrical junction block happen to be occupied by electrical units, there is no possibility for a future expansion of the number of electrical units to be installed. In order to avoid this scenario, an even larger conventional electrical junction block will be required, which will further increase the costs and the bulkiness, the increased bulkiness being especially relevant and negative to cases when there is a limited available installation space, for example with regard to vehicles.

It is to be understood that a plurality of electrical units comprises two or more electrical units. It is to be understood that a plurality of electrical junction blocks comprises two or more electrical junction blocks.

The terminal may comprise one or more of the group of: a pole; a pin; a cavity; a clamp; and a fixing member or device. However, other sorts of terminals are also possible. The terminal may at least partly be made of an electrically conductive material.

Each electrical unit of the plurality of electrical units may comprise any one of the group of:

an electrical system, such as a control system, or a communication system, for example a message-based communication system, such as a controller area network, CAN, protocol communication system, a local interconnect network, LIN, communication system, or an Ethernet communication system;

a control unit, for example an electronic control unit, ECU;

a physical unit including one or more computer programs comprising instructions which, when the program is executed by a computer, cause the computer to carry out a method or one or more steps of a procedure or process;

one or more computer-readable mediums comprising software and/or instructions which, when the instructions are executed by a computer, cause the computer to carry out a method or one or more steps of a procedure or process;

an electrical apparatus or electrical device;

an electric light, for example a lamp;

a loudspeaker;

a fan;

a sensor, for example a pressure sensor, a temperature sensor, a vibration sensor, a velocity sensor, a flow sensor, or a position sensor etc.; and an electric power source or an electrical energy source.

Other electrical units in additional to the electrical units mentioned above are also possible.

According to an advantageous embodiment of the method according to the first aspect, each electrical junction block of the plurality of electrical junction blocks comprises two or more terminals. According to a further advantageous embodiment of the method according to the first aspect, each electrical junction block of the plurality of electrical junction blocks comprises three or more terminals.

According to an advantageous embodiment of the method according to the first aspect, the electrical interconnection of the plurality of electrical units is performed by way of the plurality of electrical junction blocks in a modular manner. The modular manner in this context is to be understood as using a plurality of electrical junction blocks for flexibility instead of using only one electrical junction block, wherein additional electrical junction blocks may be added and connected when required, for example when additional electrical units are to be subsequently connected at a later stage. For some embodiments, the modular manner in this context may be understood as using a plurality of standardized electrical junction blocks for flexibility and variety in use. An advantage of this embodiment is that the efficiency of the electrical connection of the electrical units and/or the efficiency of the associated cable harness/-es is/are further improved in an optimal manner. An advantage of this embodiment is that the flexibility of the electrical connection of the electrical units and/or the flexibility of the cable harness/-es is/are further improved.

According to a further advantageous embodiment of the method according to the first aspect, the electrical interconnection of the plurality of electrical units is performed by way of the plurality of electrical junction blocks such that each electrical junction block of the plurality of electrical junction blocks forms a module with regard to modularity. An advantage of this embodiment is that the efficiency of the electrical connection of the electrical units and/or the efficiency of the associated cable harness/-es is/are further improved in an optimal manner. An advantage of this embodiment is that the flexibility of the electrical connection of the electrical units and/or the flexibility of the cable harness/-es is/are further improved.

According to another advantageous embodiment of the method according to the first aspect, the method comprises:

electrically connecting a first electrical junction block of the plurality of electrical junction blocks to a second electrical junction block of the plurality of electrical junction blocks;

electrically connecting one or more first electrical units of the plurality of electrical units to the first electrical junction block; and electrically connecting one or more second electrical units of the plurality of electrical units to the second electrical junction block.

An advantage of this embodiment is that the efficiency of the electrical connection of the electrical units and/or the efficiency of the associated cable harness/-es is/are further improved in an optimal manner. An advantage of this embodiment is that the flexibility of the electrical connection of the electrical units and/or the flexibility of the cable harness/-es is/are further improved.

According to yet another advantageous embodiment of the method according to the first aspect, each electrical junction block of the plurality of electrical junction blocks comprises one or more rows of terminals, the terminals of the same row being electrically connected to one another, wherein the method comprises:

electrically connecting a terminal of a row of terminals of a first electrical junction block of the plurality of electrical junction blocks to a terminal of a row of terminals of a second electrical junction block of the plurality of electrical junction blocks;

electrically connecting one or more first electrical units of the plurality of electrical units to one or more terminals of each row of terminals of the first electrical junction block; and electrically connecting one or more second electrical units of the plurality of electrical units to one or more terminals of each row of terminals of the second electrical junction block.

An advantage of this embodiment is that the efficiency of the electrical connection of the electrical units and/or the efficiency of the associated cable harness/-es is/are further improved. An advantage of this embodiment is that the flexibility of the electrical connection of the electrical units and/or the flexibility of the cable harness/-es is/are further improved.

According to still another advantageous embodiment of the method according to the first aspect, each electrical junction block of the plurality of electrical junction blocks comprises a plurality of rows of terminals, the terminals of the same row being electrically connected to one another, wherein the method comprises:

electrically connecting a terminal of each row of terminals of the plurality of rows of terminals of a first electrical junction block of the plurality of electrical junction blocks to a terminal of one of the rows of terminals of the plurality of rows of terminals of a second electrical junction block of the plurality of electrical junction blocks;

electrically connecting one or more first electrical units of the plurality of electrical units to one or more terminals of each row of terminals of the plurality of rows of terminals of the first electrical junction block; and electrically connecting one or more second electrical units of the plurality of electrical units to one or more terminals of each row of terminals of the plurality of rows of terminals of the second electrical junction block.

An advantage of this embodiment is that the efficiency of the electrical connection of the electrical units and/or the efficiency of the associated cable harness/-es is/are further improved in an optimal manner. An advantage of this embodiment is that the flexibility of the electrical connection of the electrical units and/or the flexibility of the cable harness/-es is/are further improved.

According to an advantageous embodiment of the method according to the first aspect, the method comprises:

electrically connecting two or more electrical units of the plurality of electrical units to the same terminal of an electrical junction block of the plurality of electrical junction blocks.

An advantage of this embodiment is that the flexibility of the electrical connection of the electrical units and/or the flexibility of the cable harness/-es is/are further improved. An advantage of this embodiment is that the efficiency of the electrical connection of the electrical units and/or the efficiency of the associated cable harness/-es is/are further improved in an optimal manner.

According to another advantageous embodiment of the method according to the first aspect, the method comprises:

electrically connecting two or more electrical units of the plurality of electrical units to the same terminal of each row of terminals of an electrical junction block of the plurality of electrical junction blocks.

According to a further advantageous embodiment of the method according to the first aspect, each row of terminals comprises three or more terminals. An advantage of this embodiment is that the flexibility of the electrical connection of the electrical units and/or the flexibility of the cable harness/-es is/are further improved. An advantage of this embodiment is that the efficiency of the electrical connection of the electrical units and/or the efficiency of the associated cable harness/-es is/are further improved. In alternative embodiments, each row of terminals comprises one or more terminals. In alternative embodiments, each row of terminals comprises two or more terminals.

According to another advantageous embodiment of the method according to the first aspect, the one or more signals transmitted between a plurality of electrical units comprises/comprise one or more of the group of:

an electric power signal;
an electrical ground signal;
a communication system signal; and
a message-based communication system signal.

Thus, for example, the one or more transmitted signals may be applied to provide electric power to an electrical apparatus or electrical device and/or to transmit and/or receive information and/or data to/from a communication system.

According to yet another advantageous embodiment of the method according to the first aspect, the method comprises:

determining the number of electrical junction blocks to be applied based on the number of terminals of the plurality of electrical junction blocks and on the number of electrical units to be electrically connected; and applying the determined number of electrical junction blocks for the electrical interconnection of the plurality of electrical units.

An advantage of this embodiment is that the flexibility of the electrical connection of the electrical units and/or the flexibility of the cable harness/-es is/are further improved. An advantage of this embodiment is that the efficiency of the electrical connection of the electrical units and/or the efficiency of the associated cable harness/-es is/are further improved.

According to still another advantageous embodiment of the method according to the first aspect, the method comprises:

determining the number of electrical junction blocks to be applied based on the number of electrical units connectable to a terminal of an electrical junction block of the plurality of electrical junction blocks; and applying the determined number of electrical junction blocks for the electrical interconnection of the plurality of electrical units.

An advantage of this embodiment is that the flexibility of the electrical connection of the electrical units and/or the flexibility of the cable harness/-es is/are further improved. An advantage of this embodiment is that the efficiency of the electrical connection of the electrical units and/or the efficiency of the associated cable harness/-es is/are further improved.

According to an advantageous embodiment of the method according to the first aspect, the method comprises:
  determining the number of electrical junction blocks to be applied based on the number of rows of terminals of the electrical junction blocks of the plurality of electrical junction blocks; and
  applying the determined number of electrical junction blocks for the electrical interconnection of the plurality of electrical units.

An advantage of this embodiment is that the flexibility of the electrical connection of the electrical units and/or the flexibility of the cable harness/-es is/are further improved. An advantage of this embodiment is that the efficiency of the electrical connection of the electrical units and/or the efficiency of the associated cable harness/-es is/are further improved.

According to a further advantageous embodiment of the method according to the first aspect, the electrical junction blocks of the plurality of electrical junction blocks have the same number of terminals. An advantage of this embodiment is that determination of the number of electrical junction blocks to be applied for the connection of a certain number of electrical units is further facilitated. An advantage of this embodiment is that the efficiency of the electrical connection of the electrical units is further improved. However, in alternative embodiments, the electrical junction blocks of the plurality of electrical junction blocks may have different numbers of terminals.

According to another advantageous embodiment of the method according to the first aspect, the electrical junction blocks of the plurality of electrical junction blocks have the same number of rows of terminals. An advantage of this embodiment is that determination of the number of electrical junction blocks to be applied for the connection of a certain number of electrical units is further facilitated. An advantage of this embodiment is that the efficiency of the electrical connection of the electrical units is further improved. However, in alternative embodiments, the electrical junction blocks of the plurality of electrical junction blocks may have different numbers of rows of terminals.

According to yet another advantageous embodiment of the method according to the first aspect, the terminals of the plurality of electrical junction blocks are connectable to the same number of electrical units. An advantage of this embodiment is that determination of the number of electrical junction blocks to be applied for the connection of a certain number of electrical units is further facilitated. An advantage of this embodiment is that the efficiency of the electrical connection of the electrical units is further improved. However, in alternative embodiments, the terminals of the plurality of electrical junction blocks may be connectable to different numbers of electrical units.

According to a second aspect of the invention, the above mentioned and other objects are achieved with an arrangement for signal transmission between a plurality of electrical units,
  wherein the arrangement comprises a plurality of electrical junction blocks for electrically interconnecting the plurality of electrical units, and
  wherein each electrical junction block of the plurality of electrical junction blocks comprises one or more terminals.

The advantages of the arrangement according to the second aspect correspond to the above- or below-mentioned advantages of the method according to the first aspect and its embodiments and are thus not repeated here.

The advantages of the below-mentioned embodiments of the arrangement according to the second aspect correspond to the above-mentioned advantages of the above-mentioned embodiments of the method according to the first aspect and are thus not repeated hereinbelow.

According to an advantageous embodiment of the arrangement according to the second aspect, each electrical junction block of the plurality of electrical junction blocks comprises two or more terminals. According to a further advantageous embodiment of the arrangement according to the second aspect, each electrical junction block of the plurality of electrical junction blocks comprises three or more terminals.

According to an advantageous embodiment of the arrangement according to the second aspect, the arrangement is modular.

According to a further advantageous embodiment of the arrangement according to the second aspect, each electrical junction block of the plurality of electrical junction blocks forms a module with regard to modularity.

According to another advantageous embodiment of the arrangement according to the second aspect, a first electrical junction block of the plurality of electrical junction blocks is electrically connected to a second electrical junction block of the plurality of electrical junction blocks,
  wherein one or more first electrical units of the plurality of electrical units is/are electrically connected to the first electrical junction block, and
  wherein one or more second electrical units of the plurality of electrical units is/are electrically connected to the second electrical junction block.

According to still another advantageous embodiment of the arrangement according to the second aspect, each electrical junction block of the plurality of electrical junction blocks comprises one or more rows of terminals,
  wherein the terminals of the same row are electrically connected to one another,
  wherein a terminal of a row of terminals of a first electrical junction block of the plurality of electrical junction blocks is electrically connected to a terminal of a row of terminals of a second electrical junction block of the plurality of electrical junction blocks,
  wherein one or more first electrical units of the plurality of electrical units is/are electrically connected to one or more terminals of each row of terminals of the first electrical junction block, and
  wherein one or more second electrical units of the plurality of electrical units is/are electrically connected to one or more terminals of each row of terminals of the second electrical junction block.

According to still another advantageous embodiment of the arrangement according to the second aspect, each electrical junction block of the plurality of electrical junction blocks comprises a plurality of rows of terminals,
  wherein the terminals of the same row are electrically connected to one another,
  wherein a terminal of each row of terminals of the plurality of rows of terminals of a first electrical junction block of the plurality of electrical junction blocks is electrically connected to a terminal of one of the rows of terminals of the plurality of rows of terminals of a second electrical junction block of the plurality of electrical junction blocks,
  wherein one or more first electrical units of the plurality of electrical units is/are electrically connected to one or more terminals of each row of terminals of the plurality of rows of terminals of the first electrical junction block, and wherein one or more second electrical units of the plurality of electrical units is/are electrically connected to one or more terminals of each row of terminals of the plurality of rows of terminals of the second electrical junction block.

According to an advantageous embodiment of the arrangement according to the second aspect, two or more electrical units of the plurality of electrical units are electrically connected to the same terminal of an electrical junction block of the plurality of electrical junction blocks.

According to another advantageous embodiment of the arrangement according to the second aspect, two or more electrical units of the plurality of electrical units are electrically connected to the same terminal of each row of terminals of an electrical junction block of the plurality of electrical junction blocks.

According to a further advantageous embodiment of the arrangement according to the second aspect, each row of terminals comprises three or more terminals. In alternative embodiments, each row of terminals comprises one or more terminals. In alternative embodiments, each row of terminals comprises two or more terminals.

According to another advantageous embodiment of the arrangement according to the second aspect, the arrangement is configured to transmit one or more signals comprising one or more of the group of:

an electric power signal;

an electrical ground signal;

a communication system signal; and a message-based communication system signal.

Thus, for example, embodiments of the arrangement may be configured to transmit the one or more transmitted signals to provide electric power to an electrical apparatus or electrical device and/or to transmit and/or receive information and/or data to/from a communication system.

According to yet another advantageous embodiment of the arrangement according to the second aspect, the number of electrical junction blocks applied for the electrical interconnection of the plurality of electrical units is based on the number of terminals of the plurality of electrical junction blocks and on the number of electrical units to be electrically connected.

According to still another advantageous embodiment of the arrangement according to the second aspect, the number of electrical junction blocks applied for the electrical interconnection of the plurality of electrical units is based on the number of electrical units connectable to a terminal of an electrical junction block of the plurality of electrical junction blocks.

According to an advantageous embodiment of the arrangement according to the second aspect, the number of electrical junction blocks applied for the electrical interconnection of the plurality of electrical units is based on the number of rows of terminals of the electrical junction blocks of the plurality of electrical junction blocks.

According to a further advantageous embodiment of the arrangement according to the second aspect, the electrical junction blocks of the plurality of electrical junction blocks have the same number of terminals. However, in alternative embodiments, the electrical junction blocks of the plurality of electrical junction blocks may have different numbers of terminals.

According to another advantageous embodiment of the arrangement according to the second aspect, the electrical junction blocks of the plurality of electrical junction blocks have the same number of rows of terminals. However, in alternative embodiments, the electrical junction blocks of the plurality of electrical junction blocks may have different numbers of rows of terminals.

According to yet another advantageous embodiment of the arrangement according to the second aspect, the terminals of the plurality of electrical junction blocks are connectable to the same number of electrical units. However, in alternative embodiments, the terminals of the plurality of electrical junction blocks may be connectable to different numbers of electrical units.

According to a third aspect of the invention, the above mentioned and other objects are achieved with a vehicle comprising an arrangement according to any one of the embodiments disclosed above or below.

The advantages of the vehicle according to the third aspect and its embodiments correspond to the above- or below-mentioned advantages of the method according to the first aspect and its embodiments.

The vehicle may be a wheeled vehicle, i.e. a vehicle having wheels. The vehicle may for example be a bus, a tractor vehicle, a heavy vehicle, a truck, or a car. The tractor vehicle, and/or the truck, may, or may be configured to, haul, or pull, a trailer. However, other types of vehicles are possible. The vehicle may be referred to as a motor vehicle. The vehicle may be an electric vehicle, EV, for example a hybrid vehicle or a hybrid electric vehicle, HEV, or a battery electric vehicle, BEV. Thus, a hybrid electric vehicle, HEV, and a battery electric vehicle, BEV, are versions, or examples, of an electric vehicle, EV. The EV may comprise one or more electric motors or electrical machines. The vehicle may comprise a combustion engine. For some embodiments, the vehicle may include only a combustion engine for the propulsion of the vehicle.

The vehicle may comprise a powertrain. The powertrain may be configured in accordance with any one of the embodiments disclosed above or below. The vehicle may comprise one or more of the group of: a combustion engine; an electric battery; and an electric battery pack. The powertrain of the vehicle may comprise one or more of the group of: a combustion engine; an electric battery; and an electric battery pack.

The above-mentioned features and embodiments of the method, the arrangement and the vehicle, respectively, may be combined in various possible ways providing further advantageous embodiments.

Further advantageous embodiments of the method, the arrangement and the vehicle according to the present invention and further advantages with the embodiments of the present invention emerge from the detailed description of embodiments.

BRIEF DESCRIPTION OF THE DRAWINGS

Embodiments of the invention will now be illustrated, for exemplary purposes, in more detail by way of embodiments and with reference to the enclosed drawings, where similar references are used for similar parts, in which:

FIG. 1 is a schematic diagram illustrating a conventional interconnection of electrical units by way of a conventional electrical junction block;

FIG. 4 is a schematic flow chart illustrating further aspects of embodiments of the method according to the first aspect of the invention;

FIGS. 5A-5C are schematic diagrams illustrating aspects of embodiments of the method according to the first aspects and embodiments of the arrangement according to the second aspect;

FIGS. 6A-6B are schematic diagrams illustrating aspects of embodiments of the method according to the first aspects and embodiments of the arrangement according to the second aspect;

FIGS. 7A-7B are schematic diagrams illustrating aspects of embodiments of the method according to the first aspects and embodiments of the arrangement according to the second aspect;

FIGS. 9A-9B are schematic diagrams illustrating aspects of embodiments of the method according to the first aspects and embodiments of the arrangement according to the second aspect;

FIG. 11 is a schematic side view of an embodiment of the vehicle according to the third aspect to which embodiments of the method according to the first aspects and embodiments of the arrangement according to the second aspect may be applied.

DETAILED DESCRIPTION

Figure 2C:
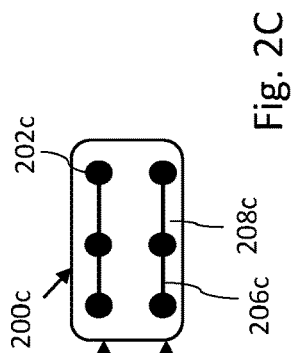
FIG. 2A-2H are schematic diagrams illustrating different versions of the electrical junction blocks applied by embodiments of the method according to the first aspect of the invention and by embodiments of the arrangement according to the second aspect of the invention.
Figure 2E:
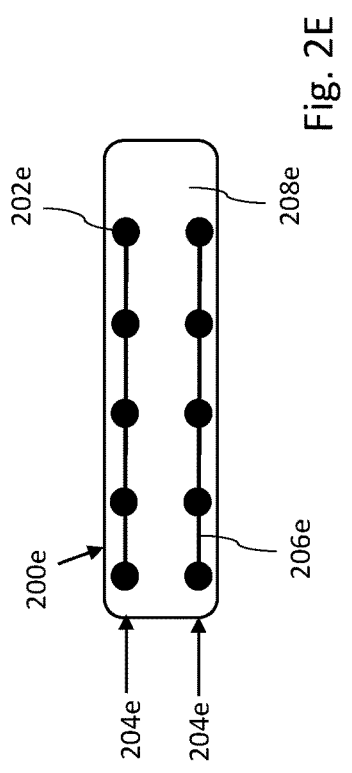
Figure 2B:
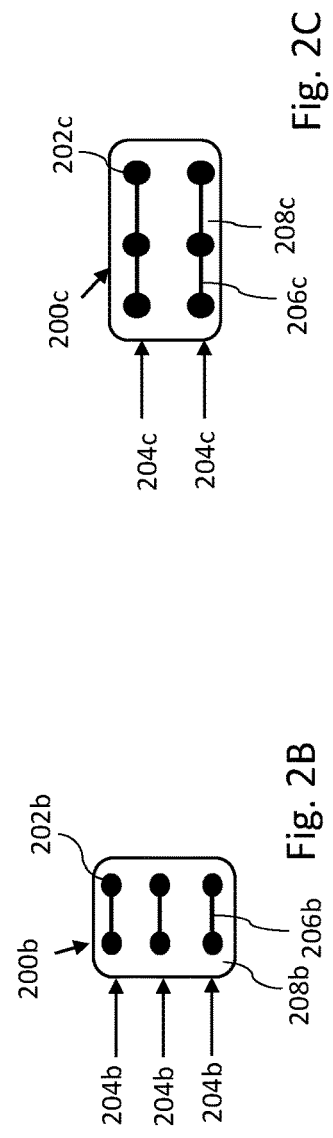

With reference to FIG. 1, a conventional interconnection of electrical units by way of a conventional electrical junction block 100 is schematically illustrated. In the example according to conventional technology illustrated in FIG. 1, each electrical unit 102 is in the form of an electric light or light unit. In the example illustrated in FIG. 1, the conventional interconnection of electrical units 102 is provided in a vehicle 104 including a plurality of wheels 106. The single large conventional electrical junction block 100 includes a first row 108, or group, of terminals 110, for example pins. The large conventional electrical junction block 100 includes a second row 112, or group, of terminals 104, for example pins. Each terminal 110 of the first row 108 represents or provides an electric power signal. Each terminal 110 of the second row 112 represents or provides an electrical ground signal, or electrical earth signal. Eight electrical units 102 in the form of eight electric lights are provided, for example at different locations in the vehicle 104. As illustrated in FIG. 1, each electrical unit 102, i.e. each electric light in the illustrated example, is electrically connected to a terminal 110 of the first row 108 and to a terminal 110 of the second row 112 of the conventional electrical junction block 100 by way of conventional wires 118, or cables, in a conventional manner. Thus, each electrical unit 102, i.e. each electric light in the illustrated example, is provided with both an electric power signal and an electrical ground signal from the conventional electrical junction block 100 to power each electrical unit 102, i.e. each electric light in the illustrated example. In general, an electric power source, for example an electric battery, is connected to the conventional electrical junction block 100. Thus, by way of the conventional electrical junction block 100, all eight electrical units 102, i.e. all electric lights in the illustrated example, can readily be electrically connected to the same electric power source in order to obtain electric power or electrical energy therefrom.

As disclosed hereinabove, in accordance with embodiments of the method according to the first aspect and embodiments of the arrangement 500a, 500b, 500c, 600a, 600b, 700a, 700b, 800a, 900a, 900b according to the second aspect, instead or applying one single conventional electrical junction block 100, a plurality of electrical junction blocks 200a-200h is applied, i.e. two or more electrical junction blocks 200a-200h.

With reference to FIGS. 2A to 2H, several versions, or embodiments, of the electrical junction blocks 200a-200h of the plurality of electrical junction blocks 200a-200h, which may be applied by embodiments of the method according to the first aspect and embodiments of the arrangement 500a, 500b, 500c, 600a, 600b, 700a, 700b, 800a, 900a, 900b according to the second aspect, are schematically illustrated. However, it is to be understood that many more versions of the electrical junction blocks 200a-200h of the plurality of electrical junction blocks 200a-200h different from the versions illustrated in FIGS. 2A to 2H are possible and may be applied by embodiments of the method according to the first aspect and embodiments of the arrangement 500a, 500b, 500c, 600a, 600b, 700a, 700b, 800a, 900a, 900b according to the second aspect. The electrical junction blocks 200a-200h of the plurality of electrical junction blocks 200a-200h may, for example, have other shapes and different numbers of terminals and/or rows of terminals compared to the versions illustrated in FIGS. 2A to 2H.

Figure 2D:
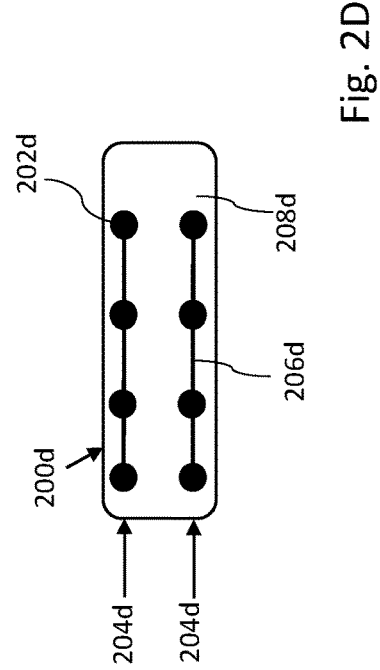
Figure 2A:
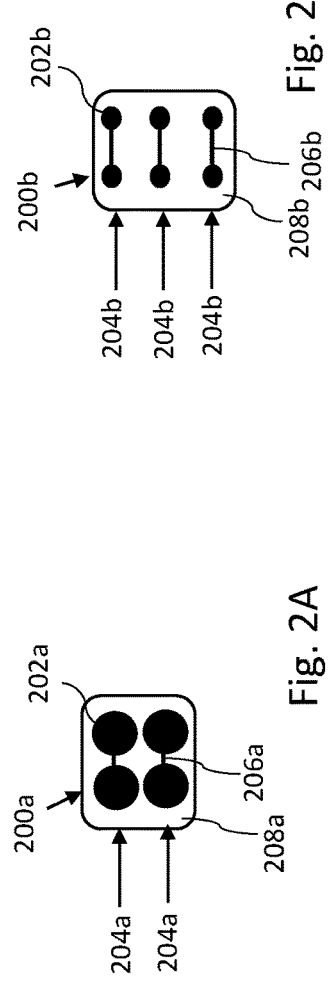
Figure 2G:
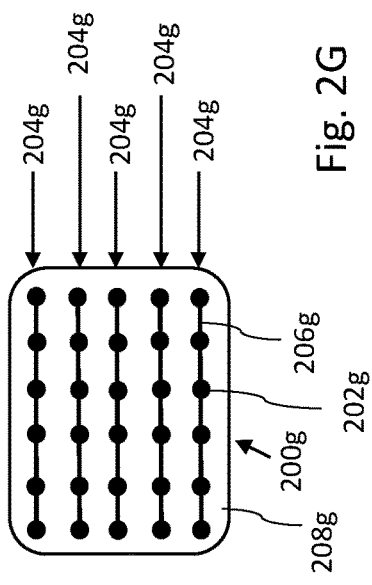
Figure 2H:
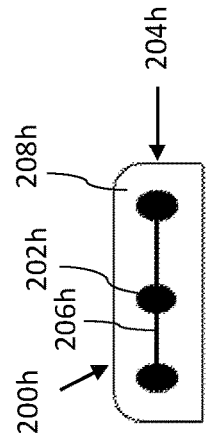

With reference to FIGS. 2A-2H, each electrical junction block 200a, 200b, 200c, 200d, 200e, 200f, 200g, 200h includes one or more terminals 202a, 202b, 202c, 202d, 202e, 202f, 202g, 202h, such as two or more terminals 202a, 202b, 202c, 202d, 202e, 202f, 202g, 202h, for example three or more terminals 202a, 202b, 202c, 202d, 202e, 202f, 202g, 202h. More specifically, in the illustrated versions, the electrical junction block 200a comprises four terminals 202a; each one 200b, 200c of the electrical junction blocks 200b and 200c comprises six terminals 202b, 202c; the electrical junction block 200d comprises eight terminals 202d; the electrical junction block 200e comprises ten terminals 202e; the electrical junction block 200f comprises fifteen terminals 202f; the electrical junction block 200g comprises thirty terminals 202g; and the electrical junction block 200h comprises three terminals 202h. However, it is to be understood that other numbers of terminals of an applicable electrical junction block are possible. With reference to FIG. 2H, in some embodiments, the two or more terminals 202h of the electrical junction block 200h of the plurality of electrical junction blocks 200h may be electrically connected to one another.

With reference to FIGS. 2A-2H, in some embodiments, the electrical junction block 200a, 200b, 200c, 200d, 200e, 200f, 200g, 200h may include one or more rows 204a, 204b, 204c, 204d, 204e, 204f, 204g, 204h, or groups, of terminals 202a, 202b, 202c, 202d, 202e, 202f, 202g, 202h. More specifically, with reference to FIGS. 2A-2G, in some embodiments, each electrical junction block 200a, 200b, 200c, 200d, 200e, 200f, 200g may include a plurality of rows 204a, 204b, 204c, 204d, 204e, 204f, 204g, or groups, of terminals 202a, 202b, 202c, 202d, 202e, 202f, 202g, i.e. two or more rows 204a, 204b, 204c, 204d, 204e, 204f, 204g of terminals 202a, 202b, 202c, 202d, 202e, 202f, 202g.

With reference to FIGS. 2A-2H, the terminals 202a, 202b, 202c, 202d, 202e, 202f, 202g, 202h of the same row 204a, 204b, 204c, 204d, 204e, 204f, 204g, 204h, or group, are electrically connected to one another, for example by way of one or more electrical conductors 206a, 206b, 206c, 206d, 206e, 206f, 206g, 206h. For some embodiments, it may be defined that the terminals 202a, 202b, 202c, 202d, 202e, 202f, 202g, 202h of the same row 204a, 204b, 204c, 204d, 204e, 204f, 204g, 204h, or group, of terminals 202a, 202b, 202c, 202d, 202e, 202f, 202g, 202h are spaced apart from, i.e. placed with a distance or space to, any other terminal 202a, 202b, 202c, 202d, 202e, 202f, 202g, 202h of any other row 204a, 204b, 204c, 204d, 204e, 204f, 204g, 204h of terminals 202a, 202b, 202c, 202d, 202e, 202f, 202g, 202h. For some embodiments, it may be defined that the terminals 202a, 202b, 202c, 202d, 202e, 202f, 202g, 202h of the same row 204a, 204b, 204c, 204d, 204e, 204f, 204g, 204h of terminals 202a, 202b, 202c, 202d, 202e, 202f, 202g, 202h are electrically insulated from any other terminal 202a, 202b, 202c, 202d, 202e, 202f, 202g, 202h of any other row 204a, 204b, 204c, 204d, 204e, 204f, 204g, 204h of terminals 202a, 202b, 202c, 202d, 202e, 202f, 202g, 202h.

More specifically, with reference to FIGS. 2A-2H, in the illustrated versions, each one 200a, 200c, 200d, 200e of the electrical junction blocks 200a, 200c, 200d and 200e includes two rows 204a, 204c, 204d, 204e of terminals 202a, 202c, 202d, 202e; each one 200b, 200f of the electrical junction blocks 200b and 200f includes three rows 204b, 204f of terminals 202b, 202f; the electrical junction block 200g includes five rows 204g of terminals 202g; and the electrical junction block 200h includes one row 204h of terminals 202h. However, it is to be understood that other numbers of rows of an applicable electrical junction block are possible.

With reference to FIGS. 2C-2H, in some embodiments, each row 204c, 204d, 204e, 204f, 204g, 204h of terminals 202c, 202d, 202e, 202f, 202g, 202h may include one or more terminals 202c, 202d, 202e, 202f, 202g, 202h, for example two or more terminals 202c, 202d, 202e, 202f, 202g, 202h, such as three or more terminals 202c, 202d, 202e, 202f, 202g, 202h. More specifically, with reference to FIGS. 2C-2H, in the illustrated versions, each row 204c, 204h of terminals 202c, 202h of any one 200c, 200h of the electrical junction blocks 200c and 200h includes three terminals 202c, 202h; each row 204d of terminals 202d of the electrical junction block 200d includes four terminals 202d; each row 204e, 204f of terminals 202e, 202f of any one 200e, 200f the electrical junction blocks 200e and 200f includes five terminals 202e, 202f; and each row 204g of terminals 202g of the electrical junction block 200g includes six terminals 202g. However, it is to be understood that other numbers of terminals in each row of an applicable electrical junction block are possible.

With reference to FIGS. 2A-2H, in some embodiments, the electrical junction block 200a, 200b, 200c, 200d, 200e, 200f, 200g, 200h may comprise a holder 208a, 208b, 208c, 208d, 208e, 208f, 208g, 208h, or body or frame, holding the terminals 202a, 202b, 202c, 202d, 202e, 202f, 202g, 202h, i.e. the terminals 202a, 202b, 202c, 202d, 202e, 202f, 202g, 202h included in the electrical junction block 200a, 200b, 200c, 200d, 200e, 200f, 200g, 200h in question. The holder 208a, 208b, 208c, 208d, 208e, 208f, 208g, 208h may be made of an electrically insulating material, for example a polymer material, or any other suitable material providing electrical insulation. In some embodiments, the electrical junction block 200a, 200b, 200c, 200d, 200e, 200f, 200g, 200h may comprise, or be configured to be provided with, one or more attachments for attaching the electrical junction block 200a, 200b, 200c, 200d, 200e, 200f, 200g, 200h to a structure or configuration, for example a structure or configuration of a vehicle 952 (see FIG. 11), such as a frame or a chassis 953 of a vehicle 952 (see FIG. 11).

With reference to FIGS. 2A-2H, the holder 208a, 208b, 208c, 208d, 208e, 208f, 208g, 208h may be configured to space the terminals 202a, 202b, 202c, 202d, 202e, 202f, 202g, 202h of the same row 204a, 204b, 204c, 204d, 204e, 204f, 204g, 204h of terminals 202a, 202b, 202c, 202d, 202e, 202f, 202g, 202h apart from any other terminal 202a, 202b, 202c, 202d, 202e, 202f, 202g, 202h of any other row 204a, 204b, 204c, 204d, 204e, 204f, 204g, 204h of terminals 202a, 202b, 202c, 202d, 202e, 202f, 202g, 202h. The holder 208a, 208b, 208c, 208d, 208e, 208f, 208g, 208h may be configured to electrically insulate the terminals 202a, 202b, 202c, 202d, 202e, 202f, 202g, 202h of the same row 204a, 204b, 204c, 204d, 204e, 204f, 204g, 204h of terminals 202a, 202b, 202c, 202d, 202e, 202f, 202g, 202h from any other terminal 202a, 202b, 202c, 202d, 202e, 202f, 202g, 202h of any other row 204a, 204b, 204c, 204d, 204e, 204f, 204g, 204h of terminals 202a, 202b, 202c, 202d, 202e, 202f, 202g, 202h.

With reference to FIGS. 2A-2H, each terminal 202a, 202b, 202c, 202d, 202e, 202f, 202g, 202h may comprise one or more of the group of: a pole; a pin; a cavity; a clamp; and a fixing member or device. However, other types of terminals are also possible. The terminal 202a, 202b, 202c, 202d, 202e, 202f, 202g, 202h may at least partly be made of an electrically conductive material.

Figure 3:
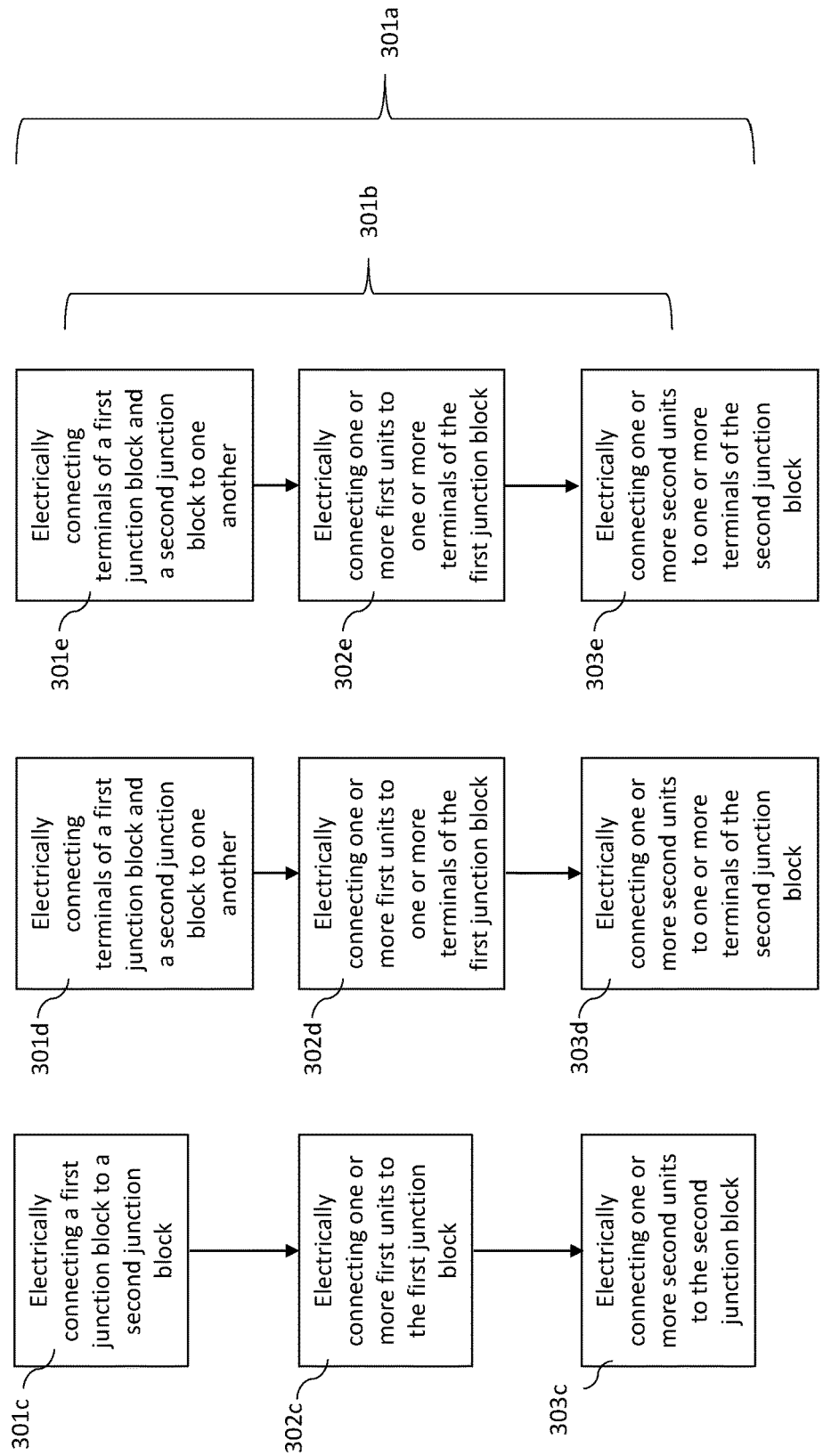
FIG. 3 is a schematic flow chart illustrating aspects of embodiments of the method according to the first aspect of the invention.

With reference to FIG. 3, aspects of embodiments of the method for a process of signal transmission between a plurality of electrical units 502, 506, 508, 510, 512 according to the first aspect are schematically illustrated in a flow chart. For some embodiments, the method according to the first aspect may be referred to as a method for electrically interconnecting a plurality of electrical units 502, 506, 508, 510, 512. It is to be understood that a plurality of electrical units 502, 506, 508, 510, 512 comprises two or more electrical units 502, 506, 508, 510, 512.

Each electrical unit 502, 506, 508, 510, 512 of the plurality of electrical units 502, 506, 508, 510, 512 may comprise any one of the group of:
an electrical system, such as a control system, or a communication system, for example a message-based communication system, such as a controller area network, CAN, protocol communication system, a local interconnect network, LIN, communication system, or an Ethernet communication system;
a control unit, for example an electronic control unit, ECU;
a physical unit including one or more computer programs comprising instructions which, when the program is executed by a computer, cause the computer to carry out a method or one or more steps of a procedure or process;
one or more computer-readable mediums comprising software and/or instructions which, when the instructions are executed by a computer, cause the computer to carry out a method or one or more steps of a procedure or process;
an electrical apparatus or electrical device;
an electric light or electric light unit, such as a LED light, or a lamp;

a loudspeaker;

a fan;

a sensor, for example a pressure sensor, a temperature sensor, a vibration sensor, a velocity sensor, a flow sensor, or a position sensor etc.; and an electric power source or an electrical energy source.

However, other electrical units 502, 506, 508, 510, 512 in additional to the electrical units 502, 506, 508, 510, 512 mentioned above are possible.

With reference to FIG. 3, embodiments of the method comprise:

electrically interconnecting 301a the plurality of electrical units 502, 506, 508, 510, 512 by way of a plurality of electrical junction blocks 200a, 200b, 200c, 200d, 200e, 200f, 200g, 200h, wherein each electrical junction block 200a, 200b, 200c, 200d, 200e, 200f, 200g, 200h of the plurality of electrical junction blocks 200a, 200b, 200c, 200d, 200e, 200f, 200g, 200h comprises one or more terminals 202a, 202b, 202c, 202d, 202e, 202f, 202g, 202h, for example two or more terminals 202a, 202b, 202c, 202d, 202e, 202f, 202g, 202h, such as three or more terminals 202a, 202b, 202c, 202d, 202e, 202f, 202g, 202h.

It is to be understood that a plurality of electrical junction blocks 200a, 200b, 200c, 200d, 200e, 200f, 200g, 200h comprises two or more electrical junction blocks 200a, 200b, 200c, 200d, 200e, 200f, 200g, 200h.

With reference to FIG. 3, in some embodiments, the step of electrically interconnecting 301a the plurality of electrical units 502, 506, 508, 510, 512 by way of a plurality of electrical junction blocks 200a, 200b, 200c, 200d, 200e, 200f, 200g, 200h may include electrically interconnecting 301b the plurality of electrical units 502, 506, 508, 510, 512 by way of, or by means of, the plurality of electrical junction blocks 200a, 200b, 200c, 200d, 200e, 200f, 200g, 200h by way of, or by means of, electrical cables 504 or wires. For example, the electrical cables 504 or wires may be included in one or more cable harnesses.

For some embodiments, it may be defined that the electrical interconnection of the plurality of electrical units 502, 506, 508, 510, 512 is performed by way of the plurality of electrical junction blocks 200a, 200b, 200c, 200d, 200e, 200f, 200g, 200h in a modular manner. For some embodiments, it may be defined that the electrical interconnection of the plurality of electrical units 502, 506, 508, 510, 512 is performed by way of the plurality of electrical junction blocks 200a, 200b, 200c, 200d, 200e, 200f, 200g, 200h such that each electrical junction block 200a, 200b, 200c, 200d, 200e, 200f, 200g, 200h of the plurality of electrical junction blocks 200a, 200b, 200c, 200d, 200e, 200f, 200g, 200h forms a module with regard to modularity.

With reference to FIG. 3, for some embodiments, the method may include the steps of:

electrically connecting 301c, for example by way of one or more electrical cables 504, a first electrical junction block 200a, 200b, 200c, 200d, 200e, 200f, 200g, 200h of the plurality of electrical junction blocks 200a, 200b, 200c, 200d, 200e, 200f, 200g, 200h to a second electrical junction block 200a, 200b, 200c, 200d, 200e, 200f, 200g, 200h of the plurality of electrical junction blocks 200a, 200b, 200c, 200d, 200e, 200f, 200g, 200h;

electrically connecting 302c, for example by way of one or more electrical cables 504, one or more first electrical units 502, 506 of the plurality of electrical units to the first electrical junction block 200a, 200b, 200c, 200d, 200e, 200f, 200g, 200h; and electrically connecting 303c, for example by way of one or more electrical cables 504, one or more second electrical units 508 of the plurality of electrical units to the second electrical junction block 200a, 200b, 200c, 200d, 200e, 200f, 200g, 200h.

With reference to FIG. 3, for some embodiments, wherein each electrical junction block 200a, 200b, 200c, 200d, 200e, 200f, 200g, 200h of the plurality of electrical junction blocks 200a, 200b, 200c, 200d, 200e, 200f, 200g, 200h comprises one or more rows 204a, 204b, 204c, 204d, 204e, 204f, 204g, 204h of terminals 202a, 202b, 202c, 202d, 202e, 202f, 202g, 202h, and wherein the terminals 202a, 202b, 202c, 202d, 202e, 202f, 202g, 202h of the same row 204a, 204b, 204c, 204d, 204e, 204f, 204g, 204h are electrically connected to one another, the method may include the steps of:

electrically connecting 301d, for example by way of one or more electrical cables 504, a terminal 202a, 202b, 202c, 202d, 202e, 202f, 202g, 202h of a row 204a, 204b, 204c, 204d, 204e, 204f, 204g, 204h of terminals 202a, 202b, 202c, 202d, 202e, 202f, 202g, 202h of a first electrical junction block 200a, 200b, 200c, 200d, 200e, 200f, 200g, 200h of the plurality of electrical junction blocks 200a, 200b, 200c, 200d, 200e, 200f, 200g, 200h to a terminal 202a, 202b, 202c, 202d, 202e, 202f, 202g, 202h of a row 204a, 204b, 204c, 204d, 204e, 204f, 204g, 204h of terminals 202a, 202b, 202c, 202d, 202e, 202f, 202g, 202h of a second electrical junction block 200a, 200b, 200c, 200d, 200e, 200f, 200g, 200h of the plurality of electrical junction blocks 200a, 200b, 200c, 200d, 200e, 200f, 200g, 200h;

electrically connecting 302d, for example by way of one or more electrical cables 504, one or more first electrical units 502, 506 of the plurality of electrical units to one or more terminals 202a, 202b, 202c, 202d, 202e, 202f, 202g, 202h of each row 204a, 204b, 204c, 204d, 204e, 204f, 204g, 204h of terminals 202a, 202b, 202c, 202d, 202e, 202f, 202g, 202h of the first electrical junction block 200a, 200b, 200c, 200d, 200e, 200f, 200g, 200h; and electrically connecting 303d, for example by way of one or more electrical cables 504, one or more second electrical units 508 of the plurality of electrical units to one or more terminals 202a, 202b, 202c, 202d, 202e, 202f, 202g, 202h of each row 204a, 204b, 204c, 204d, 204e, 204f, 204g, 204h of terminals 202a, 202b, 202c, 202d, 202e, 202f, 202g, 202h of the second electrical junction block 200a, 200b, 200c, 200d, 200e, 200f, 200g, 200h.

With reference to FIG. 3, for some embodiments, wherein each electrical junction block 200a, 200b, 200c, 200d, 200e, 200f, 200g, 200h of the plurality of electrical junction blocks 200a, 200b, 200c, 200d, 200e, 200f, 200g, 200h comprises a plurality of rows 204a, 204b, 204c, 204d, 204e, 204f, 204g, 204h of terminals 202a, 202b, 202c, 202d, 202e, 202f, 202g, 202h, and wherein the terminals 202a, 202b, 202c, 202d, 202e, 202f, 202g, 202h of the same row 204a, 204b, 204c, 204d, 204e, 204f, 204g, 204h are electrically connected to one another, the method may include the steps of:

electrically connecting 301e, for example by way of one or more electrical cables 504, a terminal 202a, 202b, 202c, 202d, 202e, 202f, 202g, 202h of each row 204a, 204b, 204c, 204d, 204e, 204f, 204g, 204h of terminals 202a, 202b, 202c, 202d, 202e, 202f, 202g, 202h of the plurality of rows 204a, 204b, 204c, 204d, 204e, 204f, 204g, 204h of terminals 202a, 202b, 202c, 202d, 202e, 202f, 202g, 202h of a first electrical junction block 200a, 200b, 200c, 200d, 200e, 200f, 200g, 200h of the plurality of electrical junction blocks 200a, 200b, 200c, 200d, 200e, 200f, 200g, 200h to a terminal 202a, 202b, 202c, 202d, 202e, 202f, 202g, 202h of one of the rows 204a, 204b, 204c, 204d, 204e, 204f, 204g, 204h of terminals 202a, 202b, 202c, 202d, 202e, 202f, 202g, 202h of the plurality of rows 204a, 204b, 204c, 204d, 204e, 204f, 204g, 204h of terminals 202a, 202b, 202c, 202d, 202e, 202f, 202g, 202h of a second electrical junction block 200a, 200b, 200c, 200d, 200e, 200f, 200g, 200h of the plurality of electrical junction blocks 200a, 200b, 200c, 200d, 200e, 200f, 200g, 200h;

electrically connecting 302e, for example by way of one or more electrical cables 504, one or more first electrical units 502, 506 of the plurality of electrical units to one or more terminals 202a, 202b, 202c, 202d, 202e, 202f, 202g, 202h of each row 204a, 204b, 204c, 204d, 204e, 204f, 204g, 204h of terminals 202a, 202b, 202c, 202d, 202e, 202f, 202g, 202h of the plurality of rows 204a, 204b, 204c, 204d, 204e, 204f, 204g, 204h of terminals 202a, 202b, 202c, 202d, 202e, 202f, 202g, 202h of the first electrical junction block 200a, 200b, 200c, 200d, 200e, 200f, 200g, 200h; and electrically connecting 303e, for example by way of one or more electrical cables 504, one or more second electrical units 508 of the plurality of electrical units to one or more terminals 202a, 202b, 202c, 202d, 202e, 202f, 202g, 202h of each row 204a, 204b, 204c, 204d, 204e, 204f, 204g, 204h of terminals 202a, 202b, 202c, 202d, 202e, 202f, 202g, 202h of the plurality of rows 204a, 204b, 204c, 204d, 204e, 204f, 204g, 204h of terminals 202a, 202b, 202c, 202d, 202e, 202f, 202g, 202h of the second electrical junction block 200a, 200b, 200c, 200d, 200e, 200f, 200g, 200h.

With reference to FIG. 3 and the aspects of embodiments of the method disclosed above, it is to be understood that for some embodiments, one or more third electrical junction blocks 200a, 200b, 200c, 200d, 200e, 200f, 200g, 200h of the plurality of electrical junction blocks 200a, 200b, 200c, 200d, 200e, 200f, 200g, 200h may be electrically connected in a corresponding manner as disclosed above for the first and second electrical junction blocks 200a, 200b, 200c, 200d, 200e, 200f, 200g, 200h. Further, for some embodiments, one or more additional electrical units of the plurality of electrical units 502, 506, 508, 510, 512 may be electrically connected to the one or more third electrical junction blocks 200a, 200b, 200c, 200d, 200e, 200f, 200g, 200h, whereby one or more further embodiments is/are provided.

With reference to FIGS. 2A to 2H and 3, for some embodiments, the method may include the step of:
electrically connecting 302c, 302d, 302e, 303c, 303d, 303e two or more electrical units 502, 506, 508, 510, 512 of the plurality of electrical units 502, 506, 508, 510, 512, for example by way of two or more electrical cables 504, to the same terminal 202a, 202b, 202c, 202d, 202e, 202f, 202g, 202h of an electrical junction block 200a, 200b, 200c, 200d, 200e, 200f, 200g, 200h of the plurality of electrical junction blocks 200a, 200b, 200c, 200d, 200e, 200f, 200g, 200h, for example the same terminal 202a, 202b, 202c, 202d, 202e, 202f, 202g, 202h of each row 204a, 204b, 204c, 204d, 204e, 204f, 204g, 204h of terminals 202a, 202b, 202c, 202d, 202e, 202f, 202g, 202h of an electrical junction block 200a, 200b, 200c, 200d, 200e, 200f, 200g, 200h of the plurality of electrical junction blocks 200a, 200b, 200c, 200d, 200e, 200f, 200g, 200h.

With reference to FIGS. 2A to 2H and 3, for some embodiments of the method, each row 204a, 204b, 204c, 204d, 204e, 204f, 204g, 204h of terminals 202a, 202b, 202c, 202d, 202e, 202f, 202g, 202h may comprise one or more terminals 202a, 202b, 202c, 202d, 202e, 202f, 202g, 202h, such as two or more terminals 202a, 202b, 202c, 202d, 202e, 202f, 202g, 202h, for example three or more terminals 202a, 202b, 202c, 202d, 202e, 202f, 202g, 202h.

With reference to FIGS. 2A to 2H and 3, for some embodiments of the method, the one or more signals transmitted between a plurality of electrical units 502, 506, 508, 510, 512 may comprise one or more of the group of:
an electric power signal;
an electrical ground signal;
a communication system signal; and
a message-based communication system signal, for example of any one of the sorts mentioned above.

With reference to FIG. 4, further aspects of embodiments of the method according to the first aspect are schematically illustrated. Embodiments of the method may include one or more of the steps of:
determining 401 the number of electrical junction blocks 200a, 200b, 200c, 200d, 200e, 200f, 200g, 200h, which is/are to be applied, based on the number of terminals 202a, 202b, 202c, 202d, 202e, 202f, 202g, 202h of the plurality of electrical junction blocks 200a, 200b, 200c, 200d, 200e, 200f, 200g, 200h and on the number of electrical units 502, 506, 508, 510, 512 to be electrically connected;

determining 402 the number of electrical junction blocks 200a, 200b, 200c, 200d, 200e, 200f, 200g, 200h, which is/are to be applied, based on the number of electrical units connectable to a terminal 202a, 202b, 202c, 202d, 202e, 202f, 202g, 202h of an electrical junction block 200a, 200b, 200c, 200d, 200e, 200f, 200g, 200h of the plurality of electrical junction blocks 200a, 200b, 200c, 200d, 200e, 200f, 200g, 200h, for example connectable by way of one or more electrical cables 504;

determining 403 the number of electrical junction blocks 200a, 200b, 200c, 200d, 200e, 200f, 200g, 200h, which is/are to be applied, based on the number of rows 204a, 204b, 204c, 204d, 204e, 204f, 204g, 204h of terminals 202a, 202b, 202c, 202d, 202e, 202f, 202g, 202h of the electrical junction blocks 200a, 200b, 200c, 200d, 200e, 200f, 200g, 200h of the plurality of electrical junction blocks 200a, 200b, 200c, 200d, 200e, 200f, 200g, 200h; and applying 404 the determined number of electrical junction blocks 200a, 200b, 200c, 200d, 200e, 200f, 200g, 200h for the electrical interconnection of the plurality of electrical units 502, 506, 508, 510, 512.

With reference to FIGS. 2A to 2H, 3 and 4, for some embodiments of the method, the electrical junction blocks 200a, 200b, 200c, 200d, 200e, 200f, 200g, 200h of the plurality of electrical junction blocks 200a, 200b, 200c, 200d, 200e, 200f, 200g, 200h have the same number of terminals 202a, 202b, 202c, 202d, 202e, 202f, 202g, 202h. For some embodiments of the method, the electrical junction blocks 200a, 200b, 200c, 200d, 200e, 200f, 200g, 200h of the plurality of electrical junction blocks 200a, 200b, 200c, 200d, 200e, 200f, 200g, 200h have the same number of rows 204a, 204b, 204c, 204d, 204e, 204f, 204g, 204h of terminals 202a, 202b, 202c, 202d, 202e, 202f, 202g, 202h. For some embodiments of the method, the terminals 202a, 202b, 202c, 202d, 202e, 202f, 202g, 202h of the plurality of electrical junction blocks are connectable to the same number of electrical units 502, 506, 508, 510, 512. However, for some embodiments, electrical junction blocks of the plurality of electrical junction blocks may have different numbers of terminals, electrical junction blocks of the plurality of electrical junction blocks may have different numbers of rows of terminals, and/or terminals of the plurality of electrical junction blocks may be connectable to different numbers of electrical units.

Unless disclosed otherwise, it should be noted that the method or procedure steps illustrated in FIGS. 3 and 4 and described herein do not necessarily have to be executed in the order illustrated in FIGS. 3 and 4. The steps may essentially be executed in any suitable order. Further, one or more steps may be added without departing from the scope of the appended claims. One or more steps may be excluded from the method or procedure without departing from the scope of the appended claims.

With reference to FIGS. 5A-5C, 6A-6B, 7A-7B, 8 and 9A-9B, embodiments of the arrangement 500a, 500b, 500c, 600a, 600b, 700a, 700b, 800a, 900a, 900b for signal transmission between a plurality of electrical units 502, 506, 508, 510, 512, 702, 706, 708, 710, 902, 906, 908 according to the second aspect are schematically illustrated, and aspects of embodiments of the method according to the first aspects and are further illustrated. Embodiments of the arrangement 500a, 500b, 500c, 600a, 600b, 700a, 700b, 800a, 900a, 900b comprises a plurality of electrical junction blocks 200a, 200b, 200c, 200d, 200e, 200f, 200g, 200h for electrically interconnecting, for example by way of electrical cables 504 or wires, the plurality of electrical units 502, 506, 508, 510, 512, 702, 706, 708, 710, 902, 906, 908, wherein each electrical junction block 200a, 200b, 200c, 200d, 200e, 200f, 200g, 200h of the plurality of electrical junction blocks 200a, 200b, 200c, 200d, 200e, 200f, 200g, 200h includes one or more terminals 202a, 202b, 202c, 202d, 202e, 202f, 202g, 202h, such as two or more terminals 202a, 202b, 202c, 202d, 202e, 202f, 202g, 202h, for example three or more terminals 202a, 202b, 202c, 202d, 202e, 202f, 202g, 202h. The electrical junction blocks 200a, 200b, 200c, 200d, 200e, 200f, 200g, 200h may correspond to any of the electrical junction blocks 200a, 200b, 200c, 200d, 200e, 200f, 200g, 200h disclosed above in connection with FIGS. 2A to 2H. However, for embodiments of the arrangement 500a, 500b, 500c, 600a, 600b, 700a, 700b, 800a, 900a, 900b, other types of electrical junction blocks may be applied, for example with different numbers of terminals, different numbers of terminals in the rows of terminals and/or different numbers of rows of terminals.

With reference to FIGS. 5A-5C, 6A-6B, 7A-7B, 8 and 9A-9B, for some embodiments, the arrangement 500a, 500b, 500c, 600a, 600b, 700a, 700b, 800a, 900a, 900b according to the second aspect may be referred to as an arrangement 500a, 500b, 500c, 600a, 600b, 700a, 700b, 800a, 900a, 900b for electrically interconnecting a plurality of electrical units 502, 506, 508, 510, 512, 702, 706, 708, 710, 902, 906, 908. For some embodiments, it may be defined that the arrangement 500a, 500b, 500c, 600a, 600b, 700a, 700b, 800a, 900a, 900b is modular. For some embodiments, it may be defined that each electrical junction block 200a, 200b, 200c, 200d, 200e, 200f, 200g, 200h of the plurality of electrical junction blocks 200a, 200b, 200c, 200d, 200e, 200f, 200g, 200h forms a module with regard to modularity.

With reference to FIGS. 5A-5C, 6A-6B, 7A-7B, 8 and 9A-9B, for some embodiments of the arrangement 500a, 500b, 500c, 600a, 600b, 700a, 700b, 800a, 900a, 900b, a first electrical junction block 200a, 200b, 200c, 200d, 200e, 200f, 200g, 200h of the plurality of electrical junction blocks 200a, 200b, 200c, 200d, 200e, 200f, 200g, 200h is electrically connected, for example by way of electrical cables 504 or wires, to a second electrical junction block 200a, 200b, 200c, 200d, 200e, 200f, 200g, 200h of the plurality of electrical junction blocks 200a, 200b, 200c, 200d, 200e, 200f, 200g, 200h. One or more first electrical units 502, 506, 702, 706, 902, 906 of the plurality of electrical units 502, 506, 508, 510, 512, 702, 706, 708, 710, 902, 906, 908 may be electrically connected, for example by way of electrical cables 504 or wires, to the first electrical junction block 200a, 200b, 200c, 200d, 200e, 200f, 200g, 200h, while one or more second electrical units 508, 708, 908 of the plurality of electrical units 502, 506, 508, 510, 512, 702, 706, 708, 710, 902, 906, 908 may be electrically connected, for example by way of electrical cables 504 or wires, to the second electrical junction block 200a, 200b, 200c, 200d, 200e, 200f, 200g, 200h.

With reference to FIGS. 5A-5C, electrical junction blocks 200d as illustrated in FIG. 2D are applied, each electrical junction block 200d including two rows 204d of terminals 202d, wherein each row 204d includes four terminals 202d electrically connected to one another. With reference to FIG. 5A, an electric power source 502 is electrically connected, for example by way of one or more cables 504, to a first terminal 202d of one of the rows 204d of terminals 202d of a first electrical junction block 200d (positioned to the left in FIG. 5A) of the plurality of electrical junction blocks 200d. The electric power source 502 is also electrically connected, for example by way of one or more cables 504, to a first terminal 202d of the other one of the rows 204d of terminals 202d of the first electrical junction block 200d. The electric power source 502 may be configured to provide an electric power signal to the terminals 202d of one of the rows 204d of terminals 202d of the first electrical junction block 200d, for example the upper row 204d of terminals 202d of the first electrical junction block 200d as positioned in FIG. 5A, while the electric power source 502, or any other configuration, may be configured to provide an electrical ground signal to the terminals 202d of the other one of the rows 204d of terminals 202d of the first electrical junction block 200d, for example the lower row 204d of terminals 202d of the first electrical junction block 200d as positioned in FIG. 5A. The electric power source 502 may be described as an electrical unit 502 of the plurality of electrical units 502, 506, 508, 510, 512.

With reference to FIGS. 5A-5C, the electric power source 502 or electrical energy source may comprise any kind of electrical unit, circuit, apparatus, device or system producing or providing electrical energy, for example one or more of a group of: an electric battery unit, such as an electric battery or an electric battery pack; an electrical generator; an electric power converter, such as a DC-to-DC converter; and a fuel cell. However, other types of electric power sources or electrical energy sources are possible.

With reference to FIG. 5A, a terminal 202d of each row 204d of terminals 202d of the plurality of rows 204d of terminals 202d of the first electrical junction block 200d is electrically connected, for example by way of one or more cables 504, to a terminal 202d of one 204d of the rows 204d of terminals 202d of the plurality of rows 204d of terminals 202d of a second electrical junction block 200d (positioned to the right in FIG. 5A) of the plurality of electrical junction blocks 200d.

With reference to FIG. 5A, one or more first electrical units 506 (two first electrical units 506 in the embodiment illustrated in FIG. 5A) of the plurality of electrical units 502, 506, 508 is/are electrically connected, for example by way of one or more cables 504, to one or more terminals 202d of each row 204d of terminals 202d of the plurality of rows 204d of terminals 202d of the first electrical junction block 200d (positioned to the left in FIG. 5A). One or more second electrical units 508 (three second electrical units 508 in the embodiment illustrated in FIG. 5A) of the plurality of electrical units 502, 506, 508 is/are electrically connected, for example by way of one or more cables 504, to one or more terminals 202d of each row 204d of terminals 202d of the plurality of rows 204d of terminals 202d of the second electrical junction block 200d (positioned to the right in FIG. 5A). Each electrical unit 506, 508 of the first and second electrical units 506, 508 may comprise any one of the electrical units mentioned above. However, in FIGS. 5A to 5C, each of the first and second electrical units 506, 508 may more specifically comprise one or more electric lights, electric light units, or lamps. Thus, through the above-mentioned electrical interconnection, all of the first and second electrical units 506, 508 are provided with an electric power signal and an electrical ground signal, and thus powered by the electric power source 502, via the one or more electrical junction blocks 200d. For example, the first and second electrical units 506, 508 may be located at different locations in a vehicle 952 (see FIG. 11).

With reference to FIG. 5B, the arrangement 500b illustrated in FIG. 5B differs from the arrangement 500a of FIG. 5A in that a third electrical junction block 200d is electrically connected, for example by way of one or more cables 504, and thus replaces one of the second electrical units 508. Thus, the arrangement 500b of FIG. 5B includes three electrical junction blocks 200d. One or more third electrical units 510, for example electric lights, are electrically connected, for example by way of one or more cables 504, to the third electrical junction block 200d in a manner corresponding to the connection of the second electrical junction block 200d in FIG. 5A. With reference to FIGS. 5B and 5A, by adding the third electrical junction block 200d to the arrangement 500b of FIG. 5B, two additional electrical units 510 may be added compared to the arrangement 500a of FIG. 5A. Otherwise, other features of the arrangement 500b of FIG. 5B may correspond to features of the arrangement 500a of FIG. 5A and are thus not described in further detail again to avoid repetition.

With reference to FIG. 5C, the arrangement 500c illustrated in FIG. 5C differs from the arrangement 500b of FIG. 5B in that a fourth electrical junction block 200d is electrically connected, for example by way of one or more cables 504, and thus replaces one of the third electrical units 510. Thus, the arrangement 500c of FIG. 5C includes four electrical junction blocks 200d. One or more fourth electrical units 512, for example electric lights, are electrically connected, for example by way of one or more cables 504, to the fourth electrical junction block 200d in a manner corresponding to the connection of the second electrical junction block 200d in FIG. 5A. With reference to FIGS. 5C and 5B, by adding the fourth electrical junction block 200d to the arrangement 500c of FIG. 5C, two additional electrical units 512 may be added compared to the arrangement 500b of FIG. 5B. Otherwise, other features of the arrangement 500c of FIG. 5C may correspond to features of the arrangement 500b of FIG. 5B and are thus not described here in further detail to avoid repetition.

With reference to FIG. 5C, for some embodiments, one or more fifth electrical junction blocks 200d may be electrically connected to the arrangement 500c in a corresponding manner as disclosed above for the first, second, third and fourth electrical junction blocks 200d. Further, for some embodiments, one or more additional electrical units may be electrically connected to the one or more fifth electrical junction blocks 200d, whereby one or more further embodiments of the arrangement is/are provided.

With reference to FIGS. 5A to 5C, the same kind of electrical junction block 200d is applied. However, it is to be understood that different types of electrical junction blocks may be applied, for example with different numbers of terminals, different numbers of terminals in the rows of terminals and/or different numbers of rows of terminals, i.e. different kinds of electrical junction block may be mixed.

With reference to FIGS. 5A-5C, 6A-6B, 7A-7B, 8 and 9A-9B, embodiments of the arrangement 500a, 500b, 500c, 600a, 600b, 700a, 700b, 800a, 900a, 900b may be configured to transmit one or more signals comprising one or more of the group of:
an electric power signal;
an electrical ground signal;
a communication system signal; and
a message-based communication system signal.

With reference to FIGS. 5A to 5C, each of the arrangements 500a, 500b, 500c is configured to transmit an electric power signal and an electrical ground signal, for example between the electric power source 502 and the first, second, third and/or fourth electrical units 506, 508, 510 512 of the plurality of plurality of electrical units 502, 506, 508, 510 512.

With reference to FIGS. 6A-6B, electrical junction blocks 200c as illustrated in FIG. 2C are applied, each electrical junction block 200c including two rows 204c of terminals 202c, wherein each row 204c includes three terminals 202c electrically connected to one another. With reference to FIG. 6A, an electric power source 502 is electrically connected, for example by way of one or more cables 504, to a first terminal 202c of one of the rows 204c of terminals 202c of a first electrical junction block 200c (positioned to the left in FIG. 6A) of the plurality of electrical junction blocks 200c. The electric power source 502 is also electrically connected, for example by way of one or more cables 504, to a first terminal 202c of the other one of the rows 204c of terminals 202c of the first electrical junction block 200c. The electric power source 502 may be configured to provide an electric power signal to the terminals 202c of one of the rows 204c of terminals 202c of the first electrical junction block 200c, for example the upper row 204c of terminals 202c of the first electrical junction block 200d as positioned in FIG. 6A, while the electric power source 502, or any other configuration, may be configured to provide an electrical ground signal to the terminals 202c of the other one of the rows 204c of terminals 202c of the first electrical junction block 200c, for example the lower row 204c of terminals 202c of the first electrical junction block 200c as positioned in FIG. 6A. The electric power source 502 may be described as an electrical unit 502 of the plurality of electrical units 502, 506, 508, 510. The electric power source 502 of FIGS. 6A-6B may correspond to the electric power source 502 of FIGS. 5A-5C.

With reference to FIG. 6A, a terminal 202c of each row 204c of terminals 202c of the plurality of rows 204c of terminals 202c of the first electrical junction block 200c is electrically connected, for example by way of one or more cables 504, to a terminal 202c of one 204c of the rows 204c of terminals 202c of the plurality of rows 204c of terminals 202c of a second electrical junction block 200c (positioned to the right in FIG. 6A) of the plurality of electrical junction blocks 200c.

With reference to FIG. 6A, two or more first electrical units 502, 506 (eight first electrical units 506 in the embodiment illustrated in FIG. 6A) of the plurality of electrical units 502, 506, 508 are electrically connected, for example by way of one or more cables 504, to one or more terminals 202c of each row 204c of terminals 202c of the plurality of rows 204c of terminals 202c of the first electrical junction block 200c (positioned to the left in FIG. 6A). As illustrated in FIG. 6A, in the shown embodiment, two or more first electrical units 502, 506 of the plurality of electrical units 502, 506, 508 are electrically connected, for example by way of one or more cables 504, to the same terminal 202c of the first electrical junction block 200c (positioned to the left in FIG. 6A) of the plurality of electrical junction blocks 200c, for example the same terminal 202c of each row 204c of terminals 202c of the first electrical junction block 200c (positioned to the left in FIG. 6A) of the plurality of electrical junction blocks 200c.

With reference to FIG. 6A, two or more second electrical units 508 (eight second electrical units 508 in the embodiment illustrated in FIG. 6A) of the plurality of electrical units 502, 506, 508 are electrically connected, for example by way of one or more cables 504, to one or more terminals 202c of each row 204c of terminals 202c of the plurality of rows 204c of terminals 202c of the second electrical junction block 200c (positioned to the right in FIG. 6A). As illustrated in FIG. 6A, in the shown embodiment, two or more second electrical units 508 of the plurality of electrical units 502, 506, 508 are electrically connected, for example by way of one or more cables 504, to the same terminal 202c of the second electrical junction block 200c (positioned to the right in FIG. 6A) of the plurality of electrical junction blocks 200c, for example to the same terminal 202c of each row 204c of terminals 202c of the second electrical junction block 200c (positioned to the right in FIG. 6A) of the plurality of electrical junction blocks 200c.

With reference to FIG. 6A, each electrical unit 506, 508 of the first and second electrical units 506, 508 may comprise any one of the electrical units mentioned above. However, in FIGS. 6A and 6B, each of the first and second electrical units 506, 508 may more specifically comprise one or more electric lights or lamps. Thus, through the abovementioned electrical interconnection, all of the first and second electrical units 506, 508 are provided with an electric power signal and an electrical ground signal, and thus powered by the electric power source 502, via the one or more electrical junction blocks 200c. For example, and as mentioned above, the first and second electrical units 506, 508 may be located at different locations in a vehicle 952 (see figure and 11).

With reference to FIG. 6B, the arrangement 600b illustrated in FIG. 6B differs from the arrangement 600a of FIG. 6A in that a third electrical junction block 200c is electrically connected, for example by way of one or more cables 504, and has thus replaced one of the second electrical units 508. Thus, the arrangement 600b of FIG. 6B includes three electrical junction blocks 200c. One or more third electrical units 510, for example electric lights, are electrically connected, for example by way of one or more cables 504, to the third electrical junction block 200c in a manner corresponding to the connection of the second electrical junction block 200c in FIG. 6A. With reference to FIGS. 6B and 6A, by adding the third electrical junction block 200c to the arrangement 600b of FIG. 6B, seven additional electrical units 510 may be added. Otherwise, other features of the arrangement 600b of FIG. 6B may correspond to features of the arrangement 600a of FIG. 6A and are thus not described here in further detail again to avoid repetition.

With reference to FIG. 6B, for some embodiments, one or more fourth electrical junction blocks 200c may be electrically connected to the arrangement 600b in a corresponding manner as disclosed above for the first, second and third electrical junction blocks 200c. Further, for some embodiments, one or more additional electrical units may be electrically connected to the one or more fourth electrical junction blocks 200c, whereby one or more further embodiments of the arrangement is/are provided.

Figure 2F:
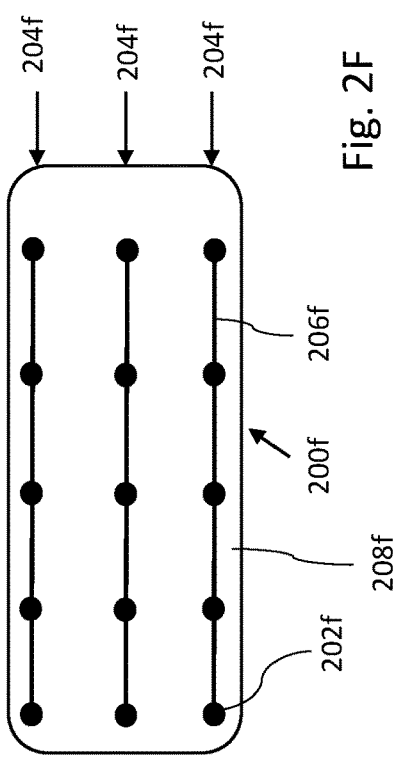

With reference to FIGS. 7A-7B, electrical junction blocks 200f as illustrated in FIG. 2F are applied, each electrical junction block 200f including three rows 204f of terminals 202f, wherein each row 204f includes five terminals 202f electrically connected to one another. With reference to FIG. 7A, a control and/or communication system 702 is electrically connected, for example by way of one or more cables 704, to a first terminal 202f of a first row 204f of terminals 202f (the upper row 204f as illustrated in FIG. 7A) of a first electrical junction block 200f (positioned to the left in FIG. 7A) of the plurality of electrical junction blocks 200f. The control and/or communication system 702 is electrically connected, for example by way of one or more cables 704, to a first terminal 202f of a second row 204f of terminals 202f (the middle row 204f as illustrated in FIG. 7A) of the first electrical junction block 200f (positioned to the left in FIG. 7A) of the plurality of electrical junction blocks 200f. The control and/or communication system 702 is electrically connected, for example by way of one or more cables 704, to a first terminal 202f of a third row 204f of terminals 202f (the lower row 204f as illustrated in FIG. 7A) of the first electrical junction block 200f (positioned to the left in FIG. 7A) of the plurality of electrical junction blocks 200f.

With reference to FIGS. 7A-7B, the control and/or communication system 702 may comprise a message-based communication system, such as a controller area network, CAN, protocol communication system. Alternatively, the control and/or communication system 702 may comprise a control unit, for example an electronic control unit, ECU, included in a message-based communication system, such as a controller area network, CAN, protocol communication system. The control and/or communication system 702 may be configured to transmit communication system signals, such as message-based communication system signals through, or via, the first, second and third rows 204f of terminals 202f. For example, the control and/or communication system 702 may be configured to transmit CAN-High through, or via, the first row 204f of terminals 202f (the upper row 204f as illustrated in FIG. 7A) of the electrical junction blocks 200f of the plurality of electrical junction blocks 200f. The control and/or communication system 702 may be configured to transmit CAN-Low through, or via, the second row 204f of terminals 202f (the middle row 204f as illustrated in FIG. 7A) of the electrical junction blocks 200f of the plurality of electrical junction blocks 200f. The control and/or communication system 702 may be configured to transmit CAN-Shield through, or via, the third row 204f of terminals 202f (the lower row 204f as illustrated in FIG. 7A) of the electrical junction blocks 200f of the plurality of electrical junction blocks 200f. The control and/or communication system 702 may be described as an electrical unit. Thus, the arrangement 700a may be configured to transmit one or more signals comprising one or more of a communication system signal and a message-based communication system signal.

With reference to FIG. 7A, a terminal 202f of each row 204f of terminals 202f of the plurality of rows 204f of terminals 202f of the first electrical junction block 200f (positioned to the left in FIG. 7A) is electrically connected, for example by way of one or more cables 704, to a terminal 202f of one 204f of the rows 204f of terminals 202f of the plurality of rows 204f of terminals 202f of a second electrical junction block 200f (positioned to the right in FIG. 7A) of the plurality of electrical junction blocks 200f.

With reference to FIG. 7A, one or more first electrical units 702, 706 (four first electrical units 702, 706 in the embodiment illustrated in FIG. 7A) of the plurality of electrical units 702, 706, 708 is/are electrically connected, for example by way of one or more cables 704, to one or more terminals 202f of each row 204f of terminals 202f of the plurality of rows 204f of terminals 202f of the first electrical junction block 200f (positioned to the left in FIG. 7A).

With reference to FIG. 7A, one or more second electrical units 708 (four second electrical units 708 in the embodiment illustrated in FIG. 7A) of the plurality of electrical units 702, 706, 708 is/are electrically connected, for example by way of one or more cables 704, to one or more terminals 202f of each row 204f of terminals 202f of the plurality of rows 204f of terminals 202f of the second electrical junction block 200f (positioned to the right in FIG. 7A).

With reference to FIG. 7A, each electrical unit 702, 706, 708 of the first and second electrical units 702, 706, 708 may comprise any of the electrical units mentioned above. However, in FIGS. 7A and 7B, each of the first and second electrical units 706, 708 may more specifically comprise an electrical system, such as a control system, or a communication system, for example a message-based communication system, such as a controller area network, CAN, protocol communication system, and/or a control unit, for example an electronic control unit, ECU. Thus, through the above-mentioned electrical interconnection, all of the first and second electrical units 706, 708 are provided with the communication system signals CAN-High, CAN-Low and CAN-Shield. For example, the first and second electrical units 706, 708 may be located at different locations in a vehicle 952 (see FIG. 11).

With reference to FIG. 7B, the arrangement 700b illustrated in FIG. 7B differs from the arrangement 700a of FIG. 7A in that a third electrical junction block 200f is electrically connected, for example by way of one or more cables 704, and has thus replaced one of the second electrical units 708. Thus, the arrangement 700b of FIG. 7B includes three electrical junction blocks 200f. One or more third electrical units 710, are electrically connected, for example by way of one or more cables 704, to the third electrical junction block 200f in a manner corresponding to the connection of the second electrical junction block 200f in FIG. 7A. With reference to FIGS. 7B and 7A, by adding the third electrical junction block 200f to the arrangement 700b of FIG. 7B, three additional electrical units 710 may be added compared to the arrangement 700a of FIG. 7A. Otherwise, other features of the arrangement 700b of FIG. 7B may correspond to features of the arrangement 700a of FIG. 7A and are thus not described here in further detail to avoid repetition.

With reference to FIG. 7B, for some embodiments, one or more fourth electrical junction blocks 200f may be electrically connected to the arrangement 700b in a corresponding manner as disclosed above for the first, second and third electrical junction blocks 200f. Further, for some embodiments, one or more additional electrical units may be electrically connected to the one or more fourth electrical junction blocks 200d, whereby one or more further embodiments of the arrangement is/are provided.

Figure 8:
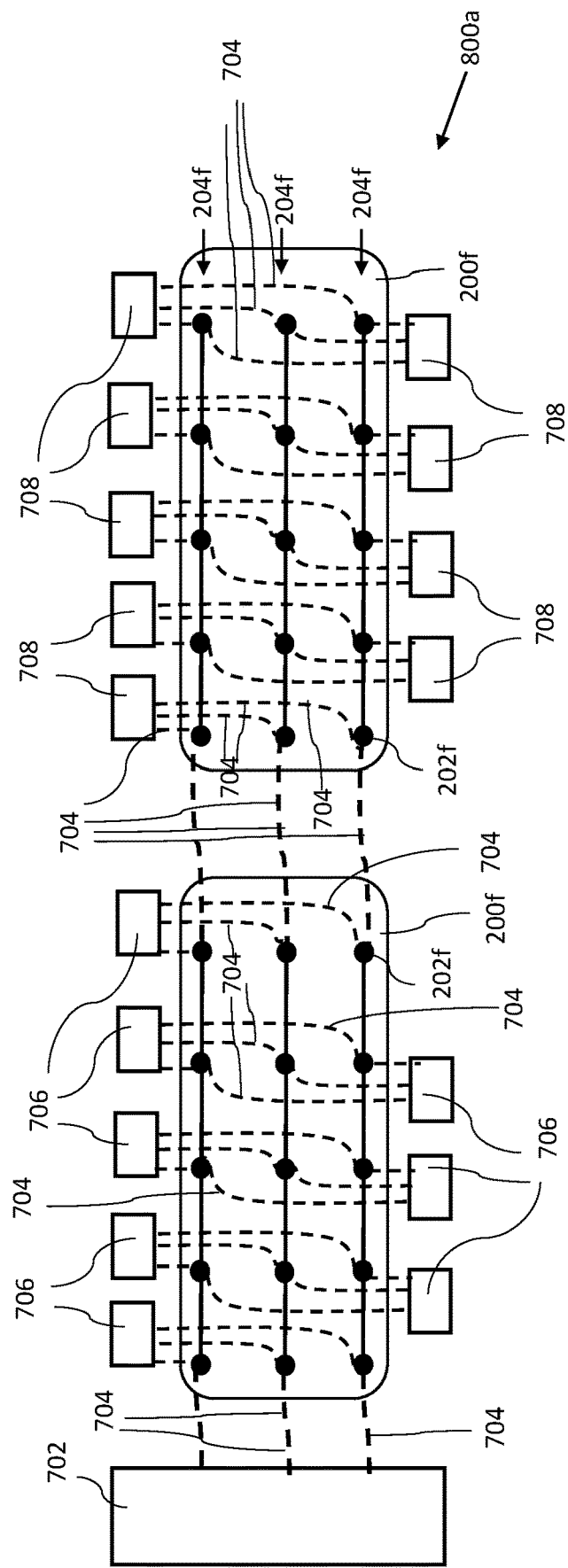
FIG. 8 is a schematic diagram illustrating aspects of embodiments of the method according to the first aspects and embodiments of arrangement according to the second aspect.

With reference to FIG. 8, the arrangement 800a of FIG. 8 correspond to a large extent to the arrangement 700a of FIG. 7A. However, the difference between the arrangement 800a of FIG. 8 and the arrangement 700a of FIG. 7A, is that in the arrangement 800a of FIG. 8, two or more electrical units 702, 706, 708 of the plurality of electrical units 702, 706, 708 of are electrically connected to the same terminal 202f of each row 204f of terminals 202f of an electrical junction block 200f of the plurality of electrical junction blocks 200f, as schematically illustrated in FIG. 8.

With reference to FIG. 8, for some embodiments, one or more third electrical junction blocks 200f may be electrically connected to the arrangement 800a in a corresponding manner as disclosed above for the first and second electrical junction blocks 200f. Further, for some embodiments, one or more additional electrical units may be electrically connected to the one or more fourth electrical junction blocks 200f, whereby one or more further embodiments of the arrangement is/are provided.

With reference to FIGS. 9A and 9B, electrical junction blocks 200h as illustrated in FIG. 2H are applied, each electrical junction block 200h including one row 204h of terminals 202h, wherein the row 204h includes three terminals 202h electrically connected to one another. With reference to FIG. 9A, a communication and/or control system 902, which may be described as an electrical unit, is electrically connected, for example by way of one or more cables 904, to a first terminal 202h of the row 204h of terminals 202h of a first electrical junction block 200d (positioned to the left in FIG. 9A) of the plurality of electrical junction blocks 200h. The communication and/or control system 902 may be configured to receive and/or send one or more communication system signals via, or through, the terminals 202h of the row 204h of terminals 202h of the electrical junction blocks 200h. Thus, the arrangement 900a may be configured to transmit one or more signals comprising a communication system signal.

With reference to FIG. 9A, a terminal 202h of the row 204h of terminals 202h of the first electrical junction block 200h is electrically connected, for example by way of one or more cables 904, to a terminal 202h of the row 204h of terminals 202h of a second electrical junction block 200h (positioned to the right in FIG. 9A) of the plurality of electrical junction blocks 200h.

With reference to FIG. 9A, one or more first electrical units 906 (one first electrical units 906 in the embodiment illustrated in FIG. 9A) of the plurality of electrical units 902, 906, 908 is/are electrically connected, for example by way of one or more cables 904, to one or more terminals 202h of the row 204h of terminals 202h of the first electrical junction block 200h (positioned to the left in FIG. 9A). One or more second electrical units 908 (two second electrical units 908 in the embodiment illustrated in FIG. 9A) of the plurality of electrical units 902, 906, 908 is/are electrically connected, for example by way of one or more cables 904, to one or more terminals 202h of the row 204h of terminals 202h of the second electrical junction block 200h (positioned to the right in FIG. 9A). Each electrical unit 906, 908 of the first and second electrical units 906, 908 may comprise any one of the electrical units mentioned above. However, in FIGS. 9A and 9B, each of the first and second electrical units 906, 908 may more specifically comprise one or more sensors or detectors, for example of the sort mentioned above. Thus, through the above-mentioned electrical interconnection, all of the first and second electrical units 906, 908 may communicate with the communication and/or control system 902 via the one or more electrical junction blocks 200h. For example, the first and second electrical units 906, 908 may be located at different locations in a vehicle 952 (see FIG. 11).

With reference to FIG. 9B, the arrangement 900b illustrated in FIG. 9B differs from the arrangement 900a of FIG. 9A in that a third electrical junction block 200h is electrically connected, for example by way of one or more cables 904, and thus replaces one of the second electrical units 908. Thus, the arrangement 900b of FIG. 9B includes three electrical junction blocks 200h. One or more third electrical units 910, for example sensors, are electrically connected, for example by way of one or more cables 904, to the third electrical junction block 200h in a manner corresponding to the connection of the second electrical junction block 200h in FIG. 9A. With reference to FIGS. 9B and 9A, by adding the third electrical junction block 200h to the arrangement 900b of FIG. 9B, one additional electrical unit 510 may be added compared to the arrangement 900a of FIG. 900a. Otherwise, other features of the arrangement 900b of FIG. 9B may correspond to features of the arrangement 900a of FIG. 9A and are thus not described here in further detail to avoid repetition.

With reference to FIGS. 9A and 9B, for some alternative embodiments, each electrical junction block 200h may include one or two terminals 202h. For some alternative embodiments, two or more electrical units 902, 906, 908, 910 of the plurality of electrical units 902, 906, 908, 910 may be electrically connected to the same terminal 202h of an electrical junction block 200h.

With reference to FIG. 9B, for some embodiments, one or more fourth electrical junction blocks 200h may be electrically connected to the arrangement 900b in a corresponding manner as disclosed above for the first, second and third electrical junction blocks 200h. Further, for some embodiments, one or more additional electrical units may be electrically connected to the one or more fourth electrical junction blocks 200h, whereby one or more further embodiments of the arrangement is/are provided.

With reference to FIGS. 9A and 9B, the same kind of electrical junction block 200h is applied. However, it is to be understood that different types of electrical junction blocks may be applied, for example with different numbers of terminals, different numbers of terminals in the rows of terminals and/or different numbers of rows of terminals, i.e. different kinds of electrical junction block may be mixed.

The electrical cables 504, 704, 904 disclosed above may be included in one or more cable harnesses. The electrical connection between an electrical cable 504, 704, 904 and a terminal 202a, 202b, 202c, 202d, 202e, 202f, 202g, 202h may also comprise a mechanical connection or attachment between the electrical cable 504, 704, 904 and the terminal 202a, 202b, 202c, 202d, 202e, 202f, 202g, 202h. It may be defined that the electrical junction block 200a, 200b, 200c, 200d, 200e, 200f, 200g, 200h is configured for mechanical connection, for example via an electrical cable 504, 704, 904, to one or more electrical units. It may be defined that the terminal 202a, 202b, 202c, 202d, 202e, 202f, 202g, 202h is configured for electrical connection to one or more electrical cables 504, 704, 904 or wires. It may be defined that the terminal 202a, 202b, 202c, 202d, 202e, 202f, 202g, 202h is configured for mechanical connection to one or more electrical cables 504, 704, 904 or wires. It is to be understood that the electrical cables 504, 704, 904 in the figures are schematically illustrated and that they may extend longer distances and may extend differently in relation to illustrations in the figures.

With reference to FIGS. 5B, 5C, 6B, 7B and 9B, for some embodiments, the method may comprise electrically interconnecting 301a three or more electrical units 502, 506, 508, 510, 512, 702, 706, 708, 710, 902, 906, 908, 910 by way of three or more electrical junction blocks 200d, 200c, 200f, 200h, wherein each electrical junction block 200d, 200c, 200f, 200h of the three or more electrical junction blocks 200d, 200c, 200f, 200h comprises one, two, three or more terminals 202d, 202c, 202f, 202h. For some embodiments, the arrangement 500b, 500c, 600b, 700b, 900b may comprise three or more electrical junction blocks 200d, 200c, 200f, 200h for electrically interconnecting the three or more electrical units 502, 506, 508, 510, 512, 702, 706, 708, 710, 902, 906, 908, 910, wherein each electrical junction block 200d, 200c, 200f, 200h of the three or more electrical junction blocks 200d, 200c, 200f, 200h comprises one, two, three or more terminals 202d, 202c, 202f, 202h.

With reference to FIGS. 5C, for some embodiments, the method may comprise electrically interconnecting 301a four or more electrical units 502, 506, 508, 510, 512 by way of four or more electrical junction blocks 200d, wherein each electrical junction block 200d of the four or more electrical junction blocks 200d comprises one, two, three or more terminals 202d. For some embodiments, the arrangement 500c may comprise four or more electrical junction blocks 200d for electrically interconnecting the four or more electrical units 502, 506, 508, 510, 512, wherein each electrical junction block 200d of the four or more electrical junction blocks 200d comprises one, two, three or more terminals 202d.

With reference to FIGS. 2A to 2H and 5A to 9B, for some embodiments of the arrangement 500a, 500b, 500c, 600a, 600b, 700a, 700b, 800a, 900a, 900b, the number of electrical junction blocks 200a, 200b, 200c, 200d, 200e, 200f, 200g, 200h applied for the electrical interconnection of the plurality of electrical units is based on the number of terminals 202a, 202b, 202c, 202d, 202e, 202f, 202g, 202h of the plurality of electrical junction blocks 200a, 200b, 200c, 200d, 200e, 200f, 200g, 200h and on the number of electrical units 502, 506, 508, 510, 512, 702, 706, 708, 710, 902, 906, 908, 910 to be electrically connected. For some embodiments of the arrangement 500a, 500b, 500c, 600a, 600b, 700a, 700b, 800a, 900a, 900b, the number of electrical junction blocks 200a, 200b, 200c, 200d, 200e, 200f, 200g, 200h applied for the electrical interconnection of the plurality of electrical units 502, 506, 508, 510, 512, 702, 706, 708, 710, 902, 906, 908, 910 is based on the number of electrical units 502, 506, 508, 510, 512, 702, 706, 708, 710, 902, 906, 908, 910 connectable to a terminal 202a, 202b, 202c, 202d, 202e, 202f, 202g, 202h of an electrical junction block 200a, 200b, 200c, 200d, 200e, 200f, 200g, 200h of the plurality of electrical junction blocks 200a, 200b, 200c, 200d, 200e, 200f, 200g, 200h. For some embodiments of the arrangement 500a, 500b, 500c, 600a, 600b, 700a, 700b, 800a, 900a, 900b, the number of electrical junction blocks 200a, 200b, 200c, 200d, 200e, 200f, 200g, 200h applied for the electrical interconnection of the plurality of electrical units 502, 506, 508, 510, 512, 702, 706, 708, 710, 902, 906, 908, 910 is based on the number of rows 204a, 204b, 204c, 204d, 204e, 204f, 204g, 204h of terminals 202a, 202b, 202c, 202d, 202e, 202f, 202g, 202h of the electrical junction blocks 200a, 200b, 200c, 200d, 200e, 200f, 200g, 200h of the plurality of electrical junction blocks 200a, 200b, 200c, 200d, 200e, 200f, 200g, 200h.

With reference to FIGS. 2A to 2H and 5A to 9B, for some embodiments of the arrangement 500a, 500b, 500c, 600a, 600b, 700a, 700b, 800a, 900a, 900b, the electrical junction blocks 200a, 200b, 200c, 200d, 200e, 200f, 200g, 200h of the plurality of electrical junction blocks 200a, 200b, 200c, 200d, 200e, 200f, 200g, 200h have the same number of terminals 202a, 202b, 202c, 202d, 202e, 202f, 202g, 202h. For some embodiments of the arrangement 500a, 500b, 500c, 600a, 600b, 700a, 700b, 800a, 900a, 900b, the electrical junction blocks 200a, 200b, 200c, 200d, 200e, 200f, 200g, 200h of the plurality of electrical junction blocks 200a, 200b, 200c, 200d, 200e, 200f, 200g, 200h have the same number of rows 204a, 204b, 204c, 204d, 204e, 204f, 204g, 204h of terminals 202a, 202b, 202c, 202d, 202e, 202f, 202g, 202h. For some embodiments of the arrangement 500a, 500b, 500c, 600a, 600b, 700a, 700b, 800a, 900a, 900b, the terminals 202a, 202b, 202c, 202d, 202e, 202f, 202g, 202h of the plurality of electrical junction blocks 200a, 200b, 200c, 200d, 200e, 200f, 200g, 200h are connectable to the same number of electrical units 502, 506, 508, 510, 512, 702, 706, 708, 710, 902, 906, 908, 910. However, for some embodiments of the arrangement, electrical junction blocks of the plurality of electrical junction blocks may have different numbers of terminals, electrical junction blocks of the plurality of electrical junction blocks may have different numbers of rows of terminals, and/or terminals of the plurality of electrical junction blocks may be connectable to different numbers of electrical units.

More specifically, and with reference to FIGS. 4, 5A-5C, 6A-6B, 7A-7B, 8 and 9A-9B, for some embodiments of the method, the above-mentioned steps of determining 401, 402, 403 the number of electrical junction blocks 200a, 200b, 200c, 200d, 200e, 200f, 200g, 200h to be applied may involve the application, or use, of the following formula:

$$\text{The number of electrical junction blocks required} = \frac{r(u-1)}{pc - 2r},$$

where u is the number of electrical units 506, 608, 510, 512 (for example, electric light units) to be electrically connected to a main or superior electrical unit 502, wherein the main or superior electrical unit 502 may, for example, be an electric power source, p is the number of terminals 202d of the selected electrical junction block 200d, r is the number of rows 204d of terminals 202d of the selected electrical junction block 200d, and c is the number or electrical cables 504 or electrical units 506, 608, 510, 512 electrically connectable to the same terminal 202d. The above-mentioned formula requires the application or use of substantially identical electrical junction blocks for each specific arrangement or installation, i.e. electrical junction blocks comprising the same number of terminals and the same number of rows of terminals, and that the terminals of the plurality of electrical junction blocks are connectable to the same number of electrical units or electrical cables. Further, the above-mentioned formula requires that every electrical unit, which is to be electrically connected to the main or superior electrical unit, is to be electrically connected to a terminal of every row of terminals of an electrical junction block of the selected electrical junction blocks. However, it is to be understood that identical electrical junction blocks are not necessary for embodiments of the method according to the first aspect and embodiments of the arrangement according to the second aspect, as already disclosed above.

For example, with reference to the above-mentioned formula, and the arrangement 500c and the type of electrical junction block 200d in FIG. 5C, where u=9, p=8, r=2, and c=1, the number of electrical junction blocks 200d required for the arrangement or installation would be equal to:

$$= \frac{2(9-1)}{8 \times 1 - 2 \times 2} = 4.$$

For example, with reference to the above-mentioned formula, and the arrangement 600b and the type of electrical junction block 200c in FIG. 6B, where u=22, p=6, r=2, and c=3, the number of electrical junction blocks 200c required for the arrangement or installation would be equal to:

$$= \frac{2(22-1)}{6 \times 3 - 2 \times 2} = 3.$$

For example, with reference to the above-mentioned formula, and the arrangement 700b and the type of electrical junction block 200f in FIG. 7B, where u=10, p=15, r=3, and c=1, the number of electrical junction blocks 200f required for the arrangement or installation would be equal to:

$$= \frac{3(10-1)}{15 \times 1 - 2 \times 3} = 3.$$

Figure 10:
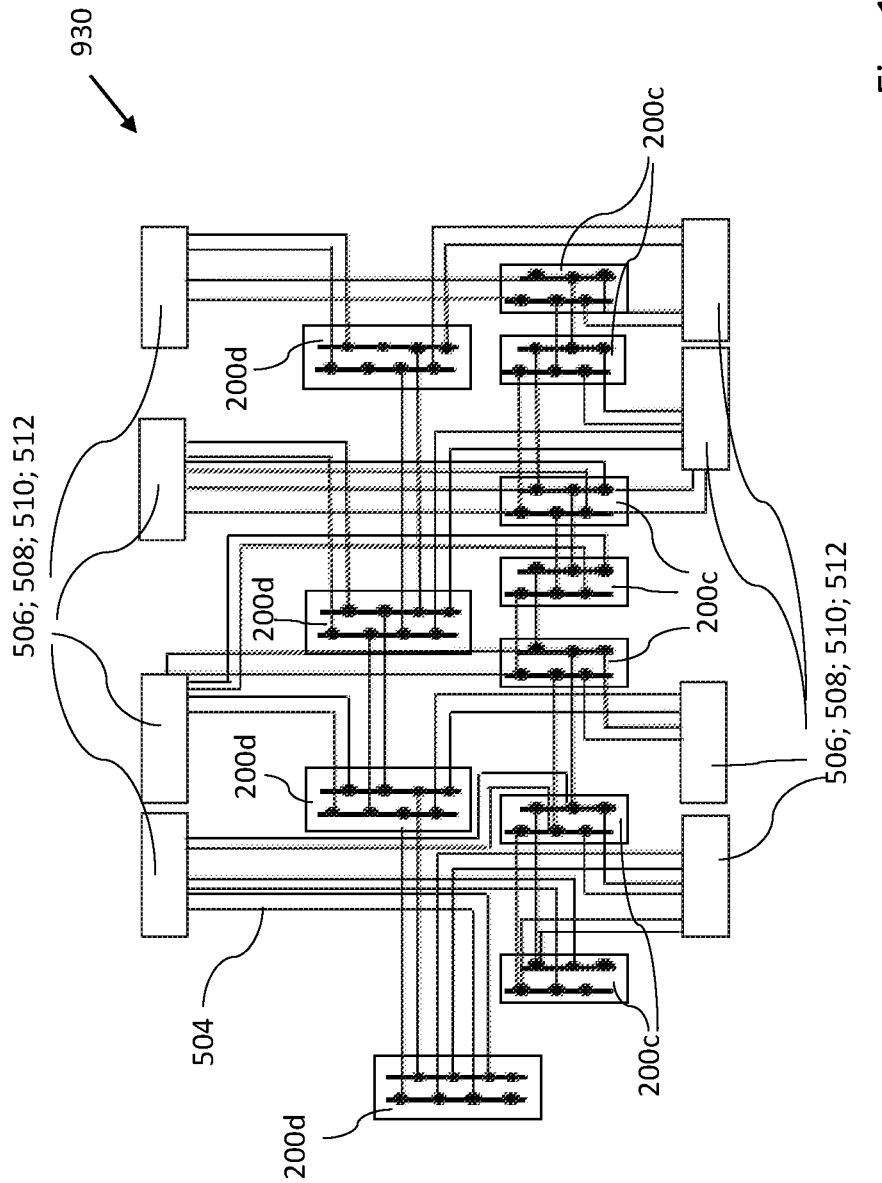
FIG. 10 is a schematic diagram illustrating in further detail aspects of embodiments of the method according to the first aspects and an embodiment of the arrangement according to the second aspect.

With reference to FIG. 10, aspects of embodiments of the method according to the first aspects and an embodiment of the arrangement 930 are schematically illustrated. A plurality of the electrical junction blocks 200d illustrated in FIG. 2D and a plurality of the electrical junction blocks 200c illustrated in FIG. 2C are electrically interconnected, for example via one or more electrical cables 504 or wires. A plurality of electrical units 506, 508, 510, 512, for example electric lights, are electrically interconnected by way of the plurality of electrical junction blocks, for example via one or more electrical cables 504 or wires. Each electric light of the plurality of electrical units 506, 508, 510, 512 may be provided with an electric power signal and an electrical ground signal via one or more electrical junction blocks 200c, 200d the plurality of electrical junction blocks 200c, 200d. The arrangement 930 of FIG. 10 may be provided or located in a vehicle 952 (see FIG. 11).

For some embodiments of the arrangement 500a, 500b, 500c, 600a, 600b, 700a, 700b, 800a, 900a, 900b, the arrangement 500a, 500b, 500c, 600a, 600b, 700a, 700b, 800a, 900a, 900b may comprise the plurality of electrical units 502, 506, 508, 510, 512, 702, 706, 708, 710, 902, 906, 908, 910.

With reference to FIG. 11, an embodiment of the vehicle 952 according to the third aspects of the invention is schematically illustrated. The vehicle 952, for example a truck, comprises six wheels 954. Only the wheels 954 on the left-hand side of the vehicle 952 are visible in FIG. 11. It is to be understood that vehicle 952 may have fewer or more wheels than what is shown in FIG. 11. The vehicle 952 may comprise a powertrain 956, which may comprise a combustion engine 958, for example an internal combustion engine or any another combustion engine, and at least two driven wheels 954 or drive wheels 954 driven by the combustion engine 958. Alternatively, the vehicle may be an electric vehicle, EV. For example, in addition to the powertrain 956 comprising the combustion engine 958, the vehicle 922 may include one or more electrical machines and may thus be a so-called hybrid electric vehicle, HEV. Alternatively, the powertrain 956 comprising the combustion engine 958 may be replaced by an electrical powertrain including one or more electrical machines for driving the drive wheels 954, whereby the vehicle may be a battery electric vehicle, BEV. Embodiments of the vehicle 952 may comprise a plurality of electrical units 502, 506, 508, 510, 512, 702, 706, 708, 710, 902, 906, 908, 910 of any one of the sorts or embodiments mentioned above. Embodiments of the vehicle 952 comprise one or more arrangements 500a, 500b, 500c, 600a, 600b, 700a, 700b, 800a, 900a, 900b according to any one of the embodiments disclosed above.

It is to be understood that embodiments of the method according to the first aspect and embodiments of the arrangement 500a, 500b, 500c, 600a, 600b, 700a, 700b, 800a, 900a, 900b according to the second aspect may be applied to configurations, structures, or apparatuses different from a vehicle 952.

The present invention is not limited to the above-described embodiments. Instead, the present invention relates to, and encompasses all different embodiments being included within the scope of the independent claims.

The invention claimed is:

1. A method for a process of signal transmission between a plurality of electrical units, wherein the method comprises:
providing an arrangement comprising a plurality of electrical junction blocks for electrically interconnecting the plurality of electrical units, wherein each electrical junction block of the plurality of electrical junction blocks comprises a plurality of rows of terminals, wherein the terminals of the same row are electrically connected to one another, wherein a terminal of each row of terminals of the plurality of rows of terminals of a first electrical junction block of the plurality of electrical junction blocks is electrically connected to a terminal of one of the rows of terminals of the plurality of rows of terminals of a second electrical junction block of the plurality of electrical junction blocks;
electrically connecting one or more first electrical units of the plurality of electrical units to one or more terminals of each row of terminals of the plurality of rows of terminals of the first electrical junction block; and
electrically connecting one or more second electrical units of the plurality of electrical units to one or more terminals of each row of terminals of the plurality of rows of terminals of the second electrical junction block.

2. A method according to claim 1, wherein the method comprises:
electrically connecting two or more electrical units of the plurality of electrical units to the same terminal of an electrical junction block of the plurality of electrical junction blocks.

3. A method according to claim 1, wherein the method comprises:
determining the number of electrical junction blocks to be applied based on the number of terminals of the plurality of electrical junction blocks and on the number of electrical units to be electrically connected; and
applying the determined number of electrical junction blocks for the electrical interconnection of the plurality of electrical units.

4. A method according to claim 3, wherein the method comprises:
determining the number of electrical junction blocks to be applied based on the number of electrical units connectable to a terminal of an electrical junction block of the plurality of electrical junction blocks; and
applying the determined number of electrical junction blocks for the electrical interconnection of the plurality of electrical units.

5. A method according to claim 3, wherein the method comprises:
determining the number of electrical junction blocks to be applied based on the number of rows of terminals of the electrical junction blocks of the plurality of electrical junction blocks; and
applying the determined number of electrical junction blocks for the electrical interconnection of the plurality of electrical units.

6. An arrangement for signal transmission between a plurality of electrical units,
wherein the arrangement comprises a plurality of electrical junction blocks for electrically interconnecting the plurality of electrical units,
wherein each electrical junction block of the plurality of electrical junction blocks comprises a plurality of rows of terminals, wherein the terminals of the same row are electrically connected to one another, wherein a terminal of each row of terminals of the plurality of rows of terminals of a first electrical junction block of the plurality of electrical junction blocks is electrically connected to a terminal of one of the rows of terminals of the plurality of rows of terminals of a second electrical junction block of the plurality of electrical junction blocks,
wherein one or more first electrical units of the plurality of electrical units is/are electrically connected to one or more terminals of each row of terminals of the plurality of rows of terminals of the first electrical junction block, and
wherein one or more second electrical units of the plurality of electrical units is/are electrically connected to one or more terminals of each row of terminals of the plurality of rows of terminals of the second electrical junction block.

7. An arrangement according to claim 6, wherein each row of terminals comprises three or more terminals.

8. An arrangement according to claim 6, wherein the arrangement is configured to transmit one or more signals comprising one or more of the group of:
an electric power signal;
an electrical ground signal;
a communication system signal; and
a message-based communication system signal.

9. An arrangement according to claim 6, wherein the electrical junction blocks of the plurality of electrical junction blocks have the same number of terminals.

10. An arrangement according to claim 6, wherein the electrical junction blocks of the plurality of electrical junction blocks have the same number of rows of terminals.

11. An arrangement according to claim 6, wherein the terminals of the plurality of electrical junction blocks are connectable to the same number of electrical units.

12. A vehicle comprising an arrangement for signal transmission between a plurality of electrical units,
wherein the arrangement comprises a plurality of electrical junction blocks for electrically interconnecting the plurality of electrical units,
wherein each electrical junction block of the plurality of electrical junction blocks comprises a plurality of rows of terminals, wherein the terminals of the same row are electrically connected to one another, wherein a terminal of each row of terminals of the plurality of rows of terminals of a first electrical junction block of the plurality of electrical junction blocks is electrically connected to a terminal of one of the rows of terminals of the plurality of rows of terminals of a second electrical junction block of the plurality of electrical junction blocks, wherein one or more first electrical units of the plurality of electrical units is/are electrically connected to one or more terminals of each row of terminals of the plurality of rows of terminals of the first electrical junction block, and wherein one or more second electrical units of the plurality of electrical units is/are electrically connected to one or more terminals of each row of terminals of the plurality of rows of terminals of the second electrical junction block.

* * * * *